United States Patent
Fujita et al.

(10) Patent No.: US 10,582,773 B2
(45) Date of Patent: Mar. 10, 2020

(54) SEAT RECLINING DEVICE AND SEAT

(71) Applicant: DELTA KOGYO CO., LTD., Aki-gun (JP)

(72) Inventors: Etsunori Fujita, Higashihiroshima (JP); Mitsuhiro Yamashita, Aki-gun (JP)

(73) Assignee: DELTA KOGYO CO., LTD., Aki-gun (JP)

( * ) Notice: Subject to any disclaimer, the term of this patent is extended or adjusted under 35 U.S.C. 154(b) by 0 days.

(21) Appl. No.: 15/573,520

(22) PCT Filed: Sep. 13, 2016

(86) PCT No.: PCT/JP2016/077026
§ 371 (c)(1),
(2) Date: Nov. 13, 2017

(87) PCT Pub. No.: WO2017/043665
PCT Pub. Date: Mar. 16, 2017

(65) Prior Publication Data
US 2018/0103760 A1    Apr. 19, 2018

(30) Foreign Application Priority Data
Sep. 13, 2015    (JP) ................. 2015-180245

(51) Int. Cl.
*A47C 1/025* (2006.01)
*B60N 2/235* (2006.01)

(52) U.S. Cl.
CPC .............. *A47C 1/025* (2013.01); *B60N 2/235* (2013.01)

(58) Field of Classification Search
CPC ................. A47C 1/025; B60N 2/235
(Continued)

(56) References Cited

U.S. PATENT DOCUMENTS

| | | |
|---|---|---|
| 4,896,398 A | 1/1990 | Pipon et al. |
| 2009/0243360 A1 | 10/2009 | Tarusawa et al. |

(Continued)

FOREIGN PATENT DOCUMENTS

| | | |
|---|---|---|
| JP | 63-68113 A | 3/1988 |
| JP | 2003-19052 A | 1/2003 |

(Continued)

OTHER PUBLICATIONS

International Search Report dated Nov. 15, 2016 in PCT/JP2016/077026 filed Sep. 13, 2016.

*Primary Examiner* — Justin V Lewis
(74) *Attorney, Agent, or Firm* — Oblon, McClelland, Maier & Neustadt, L.L.P.

(57) ABSTRACT

Wobbling among components is reduced. The seat reclining device includes: outer rolling members (80) disposed between a ring-shaped bottom surface portion (71) of a mounting ring (70) and an outer surface of a guide bracket (20) or an outer surface of an internal gear (30), that faces the ring-shaped bottom surface portion (71); and inner rolling members (90) which are disposed between opposed surfaces of guide groove portions of the guide bracket (20) and lock plates (60A to 60D) to guide the lock plates (60A, 60C) in a radial direction. Owing to the outer rolling members (80) and the inner rolling members (90), force pressing stacked members relatively to one another functions in a stacking direction, and as its reaction force, spring force of the mounting ring (70) acts, so that wobbling is reduced. As for the relative pressing force by the outer rolling members (80) and the inner rolling members (90), the pressing force by the rolling members (80, 90) acts not only in a locked state but also in an unlocked state, so that wobbling among the members is reduced in the both states.

9 Claims, 19 Drawing Sheets

(58) Field of Classification Search
USPC ...... 297/215.1, 277, 278, 285, 301.1, 301.5, 297/302.1, 302.5, 353, 354.1
See application file for complete search history.

(56) References Cited

U.S. PATENT DOCUMENTS

2011/0012414 A1   1/2011  Yamada et al.
2014/0008958 A1*  1/2014  Ito .......................... A47C 1/025
                                                                                   297/362

FOREIGN PATENT DOCUMENTS

| JP | 2005-230300 A | 9/2005 |
| JP | 2009-247392 A | 10/2009 |
| JP | 2010-22401 A | 2/2010 |

* cited by examiner (a)

(b)

SEAT RECLINING DEVICE AND SEAT

TECHNICAL FIELD

The present invention relates to a seat reclining device attached to a seat of a vehicle or the like to appropriately adjust an angle of inclination of a seat back with respect to a seat cushion, and a seat in which the seat reclining device is assembled.

BACKGROUND ART

Patent Documents 1 and 2 disclose a reclining device which includes: a guide bracket fixed to one of a seat cushion and a seat back; an internal gear fixed to the other; and lock plates disposed between the guide bracket and the internal gear and having external teeth engageable with internal teeth of the internal gear, and which keeps the seat back at an appropriate angle of inclination by making the internal gear and the lock plates engaged with each other and allows the seat back to turn forward and backward by releasing their engagement. A mounting ring is fixed to an outer peripheral surface of the guide bracket or the internal gear. The mounting ring is formed in a ring shape with a substantially L-shaped cross section having a bottom surface portion and a peripheral surface portion and is inserted from one of the guide bracket and the internal gear, its peripheral surface portion is fixed by welding or the like to the outer peripheral surface of the guide bracket or internal gear located on a far side in an insertion direction, and the internal gear or guide bracket located therebetween is rotatably supported between the guide bracket or internal gear and the bottom surface portion. This is suitable for a thickness reduction because locking is made possible by the engagement of the lock plates and the internal teeth of the internal gear which are housed inside.

PRIOR ART DOCUMENT

Patent Document

Patent Document 1: Japanese Patent Application Laid-open No. 2009-247392
Patent Document 1: Japanese Patent Application Laid-open No. 2005-230300

SUMMARY OF THE INVENTION

Problems to be Solved by the Invention

In Patent Documents 1 and 2, a cam biased by a spiral spring is disposed at the center portion, the plural lock plates are arranged in guide groove portions between adjacent guide wall portions arranged on the guide bracket in a circumferential direction at predetermined intervals, and the cam rotated by elastic force of the spiral spring causes the lock plates to slide outward in a radial direction, resulting in the engagement of the external teeth of the lock plates with the internal teeth of the internal gear. Consequently, the seat back is kept at a predetermined angle of inclination with respect to the seat cushion. On the other hand, when an operation lever is operated to rotate the cam in a reverse direction against the elastic force of the spiral spring, the cam engages with the lock plates to cause the lock plates to slide inward in the radial direction to release the locking, allowing the seat back to turn.

The radial-direction sliding of the lock plates is along the guide groove portions between the adjacent guide wall portions provided on the guide bracket as described above, and small operation clearances are provided between the guide wall portions and the lock plates. The operation clearances are essential for the smooth movement of the lock plates, but in a locked state, the operation clearances, even if small, cause the lock plates to move in a circumferential direction by an amount corresponding to the operation clearances, so that the lock plates sometimes wobble or come into contact with side surfaces of the guide wall portions to make a strange noise. Further, there is variation in the operation clearances within a range of accepted tolerance in consideration of a pressing process and a heat treatment process of the manufacture, and this also constitutes a factor causing the lock plates to wobble or make a strange noise.

In Patent Document 2, one of the guide wall portions of the guide bracket is swingable, and between this movable guide wall portion and the fixed guide wall portion disposed at a predetermined interval, a plate-shaped wedge movable in the radial direction similarly to the lock plate is provided. Further, the movable guide wall portion and the plate-shaped wedge are provided such that their inclined side surfaces inclined at a predetermined angle with respect to the radial direction abut on each other. Accordingly, when the plate-shaped wedge slides in the radial direction, the movable guide wall portion is pushed in the circumferential direction to swing and is pressed against a side surface of the lock plate disposed adjacently to the movable guide wall portion. This eliminates the operation clearance between the both to reduce the wobbling of the lock plate in a locked state.

However, in Patent Document 2, one of the guide wall portions of the guide bracket has to be swingable, and the plate-shaped wedge worked into a predetermined shape has to be disposed between the swingable movable guide wall portion and the fixed guide wall portion, which makes the structure complicated, leading to an increase of a manufacturing cost. In addition, though capable of eliminating the wobbling of the lock plate and the guide wall portion in the circumferential direction, this structure cannot eliminate an operation clearance in a stacking direction (axial direction) between the stacked members, such as the lock plates and the guide bracket or the internal gear. In particular, in an unlocked state, the wedge function in the circumferential direction does not act, which tends to increase the wobbling in the stacking direction. However, reducing the operation clearance may hinder a smooth operation at the time of the unlocking.

The present invention was made in consideration of the above, and has an object to provide a seat reclining device that has a structure capable of reducing an operation clearance in a stacking direction (axial direction) of members more than conventionally to reduce wobbling both in a locked state and in an unlocked state, nevertheless, that enables a smooth relative rotational operation of a guide bracket and an internal gear at the time of the unlocking and achieves more smooth radial-direction sliding of lock plates, and to provide a seat in which the seat reclining device is assembled.

Means for Solving the Problems

In order to solve the above problems, a seat reclining device of the present invention is a seat reclining device which includes: a guide bracket attached to one of a seat cushion and a seat back and having a plurality of guide wall portions arranged in a circumferential direction at intervals; an internal gear attached to the other of the seat cushion and the seat back; and a mounting ring having a peripheral surface portion and a ring-shaped bottom surface portion, the peripheral surface portion being fixed to an outer peripheral surface of one of the guide bracket and the internal gear, and the ring-shaped bottom surface portion protruding inward from the peripheral surface portion and being disposed on an outer surface side of the other of the guide bracket and the internal gear, and which supports the seat back so as to allow the seat back to recline with respect to the seat cushion by relative rotation of the guide bracket and the internal gear, the seat reclining device including:

a lock mechanism including lock plates which are disposed in guide groove portions between the adjacent guide wall portions provided on the guide bracket, so as to be operable in a radial direction and which each have an outer peripheral surface provided with external teeth engageable with internal teeth of the internal gear;

an outer rolling member disposed between the ring-shaped bottom surface portion of the mounting ring and the outer surface of the guide bracket or the outer surface of the internal gear, that faces the ring-shaped bottom surface portion; and an inner rolling member disposed between opposed surfaces of the guide groove portion of the guide bracket and the lock plate and rollable in the radial direction together with the lock plate, wherein, while the outer rolling member and the inner rolling member press stacked members including the internal gear, the lock plates, and the mounting ring in a stacking direction relatively to one another to reduce wobbling, the outer rolling member causes rolling friction to act between the one of the guide bracket and the internal gear that rotates together with the mounting ring and the other that rotates relatively to the one of the guide bracket and the internal gear, and the inner rolling member causes rolling friction to act between the guide groove portion and the lock plate.

Preferably, in the opposed surfaces, between which the inner rolling member is disposed, of the guide groove portion of the guide bracket and the lock plate at least at one place, support grooves are formed respectively, and the inner rolling member is supported by the support grooves.

Preferably, one of the support grooves formed in the respective opposed surfaces has a groove portion which has a length large enough for the inner rolling member to roll in the radial direction in the groove portion and whose cross section in a direction perpendicular to the radial direction has a substantially V shape.

Preferably, the groove portion whose cross section has the substantially V shape has a shape capable of being in contact with the inner rolling member at two points in a view of the cross section, and restricting circumferential-direction movement of the lock plate accompanying the inner rolling member.

Preferably, the inner rolling members are disposed between the opposed surfaces of a pair of the lock plates provided at positions facing each other across a rotation center of the relative rotation of the guide bracket and the internal gear and the corresponding guide groove portions.

Preferably, the ring-shaped bottom surface portion of the mounting ring partly has a portion where an inner peripheral end surface of the inward bent portion faces an opposed inclined surface of the guide bracket or the internal gear in an oblique direction and is closer to the opposed inclined surface than in the other portion or abuts on the opposed inclined surface.

Preferably, the ring-shaped bottom surface portion of the mounting ring partly has a portion where an inner peripheral end surface of the inward bent portion abuts on a surface of an outer surface-side peripheral edge of the guide bracket or the internal gear substantially at a right angle.

Further, a seat reclining device of the present invention is a seat reclining device which includes: a guide bracket attached to one of a seat cushion and a seat back and having a plurality of guide wall portions arranged in a circumferential direction at intervals; an internal gear attached to the other of the seat cushion and the seat back; and a mounting ring having a peripheral surface portion and a ring-shaped bottom surface portion, the peripheral surface portion being fixed to an outer peripheral surface of one of the guide bracket and the internal gear, and the ring-shaped bottom surface portion protruding inward from the peripheral surface portion and being disposed on an outer surface side of the other of the guide bracket and the internal gear, and which supports the seat back so as to allow the seat back to recline with respect to the seat cushion by relative rotation of the guide bracket and the internal gear, the seat reclining device including:

a lock mechanism including lock plates which are disposed in guide groove portions between the adjacent guide wall portions provided on the guide bracket, so as to be operable in a radial direction and which each have an outer peripheral surface provided with external teeth engageable with internal teeth of the internal gear;

an inner rolling member disposed between opposed surfaces of the guide groove portion of the guide bracket and the lock plate and rollable in the radial direction together with the lock plate, wherein, in the opposed surfaces, between which the inner rolling member is disposed, of the guide groove portion of the guide bracket and the lock plate at least at one place, support grooves are formed respectively, and the inner rolling member is supported by the support grooves, wherein one of the support grooves formed in the respective opposed surfaces has a groove portion which has a length large enough for the inner rolling member to roll in the radial direction in the groove portion and whose cross section in a direction perpendicular to the radial direction has a substantially V shape, wherein the groove portion whose cross section has the substantially V shape has a shape capable of being in contact with the inner rolling member at two points in a view of the cross section, and restricting circumferential-direction movement of the lock plate accompanying the inner rolling member.

Further, a seat of the present invention is a seat which includes a seat cushion and a seat back, the seat including any of the above-described seat reclining devices which is disposed between the seat cushion and the seat back.

Effect of the Invention

According to the present invention, the seat reclining device includes: the outer rolling member disposed between the ring-shaped bottom surface portion of the mounting ring and the outer surface of the guide bracket or the outer surface of the internal gear, that faces the ring-shaped bottom surface portion; and the inner rolling member disposed between the opposed surfaces of the guide groove portion of the guide bracket and the lock plate and reliable in the radial direction together with the lock plate. Owing to the outer rolling member and the inner rolling member, the force pressing the stacked members relatively to one another in the stacking direction functions, and as reaction force of the pressing force, spring force of the mounting ring acts to reduce wobbling. The relative pressing force by the outer rolling member and the inner rolling member acts not only in a locked state where the external teeth of the lock plates and the internal teeth of the internal gear engage with each other but also in an unlocked state, so that the wobbling among the members is reduced in both of the states. In particular, since the force reducing the wobbling in the stacking direction greatly acts, this force restricts the circumferential-direction movement to also reduce the wobbling in the circumferential direction in the locked state. On the other hand, at the time of the reclining, that is, at the time of the unlocking, the rotation of the outer rolling member acts so as to reduce frictional force between one of the guide bracket and the internal gear that rotates together with the mounting ring and the other that rotates relatively to this. Consequently, even though an operation clearance in the stacking direction is reduced more than conventionally, the frictional force is reduced by the rolling of the outer rolling member, resulting in the smooth relative rotation of the guide bracket and the internal gear.

Further, the support groove for the inner rolling member has the substantially V-shaped cross section, so that the inner rolling member is supported at two points in the sectional view taken along the circumferential direction and its rolling in the circumferential direction is restricted. At the time of the locking from the unlocked state, the lock plates smoothly displace in the radial direction to be locked owing to the radial-direction rolling of the inner rolling member along the support groove. This improves responsiveness of the locking operation and the unlocking operation of the lock plates. On the other hand, at the time of locking, when external force is applied to try to rotate the guide bracket and the internal gear relatively to each other, the inner rolling member is pressed against one of the inclined surfaces of the support groove in the cross section, so that the force restricting the circumferential-direction movement is exhibited, and at the same time, the inner rolling member rotates to displace in a direction in which it separates from the support groove, which also has an advantage of reducing the wobbling in the stacking direction (thickness direction). Therefore, even the structure with only the inner rolling member can reduce the wobbling in both of the circumferential direction and the stacking direction (thickness direction), even though it is of course preferable to include the outer rolling member.

DESCRIPTION OF EMBODIMENTS

Figure 1:
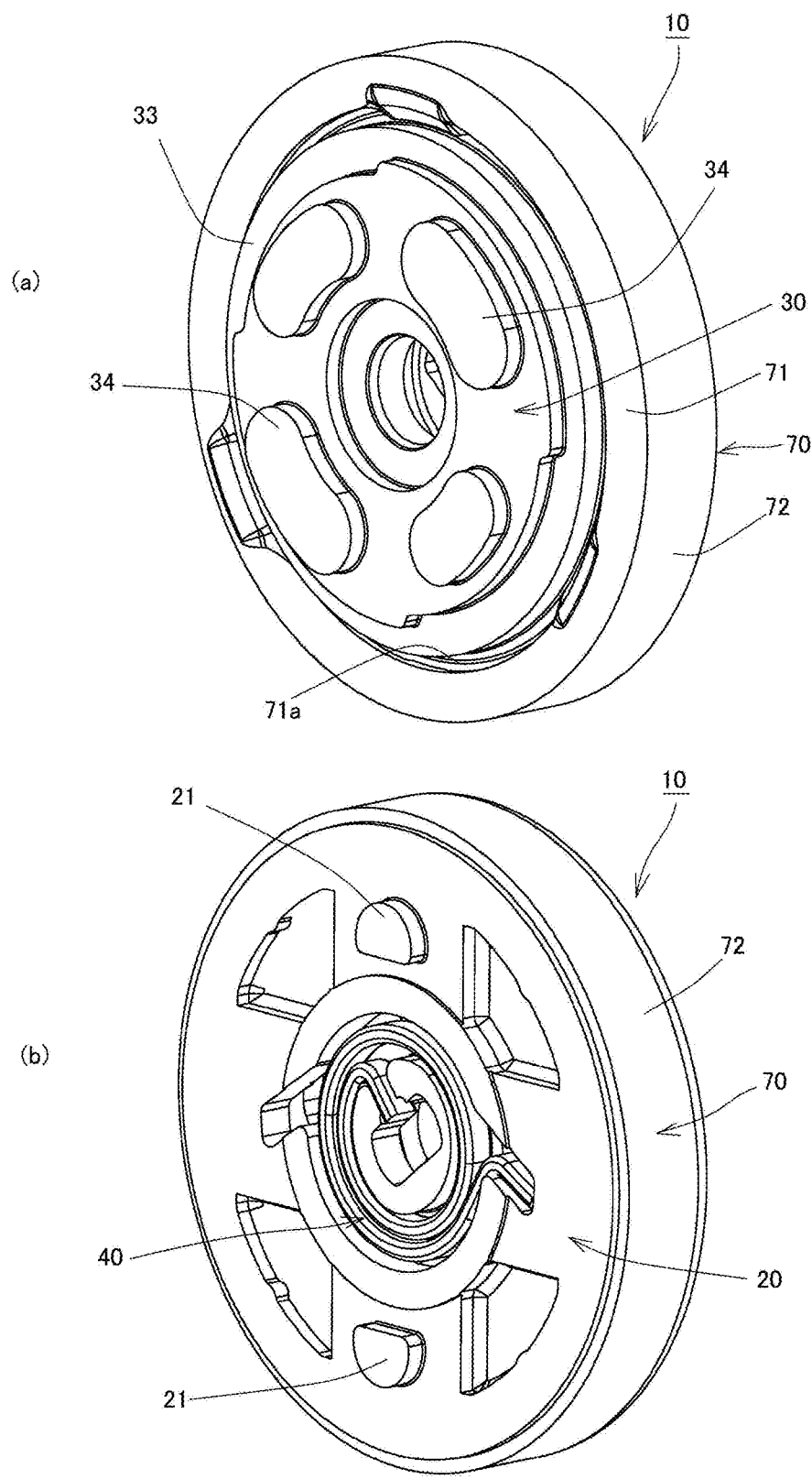
FIG. 1(a) is a perspective view of a seat reclining device according to one embodiment of the present invention seen from an internal gear side.
FIG. 1(b) is a perspective view of the same seen from a guide bracket side.
Figure 2:
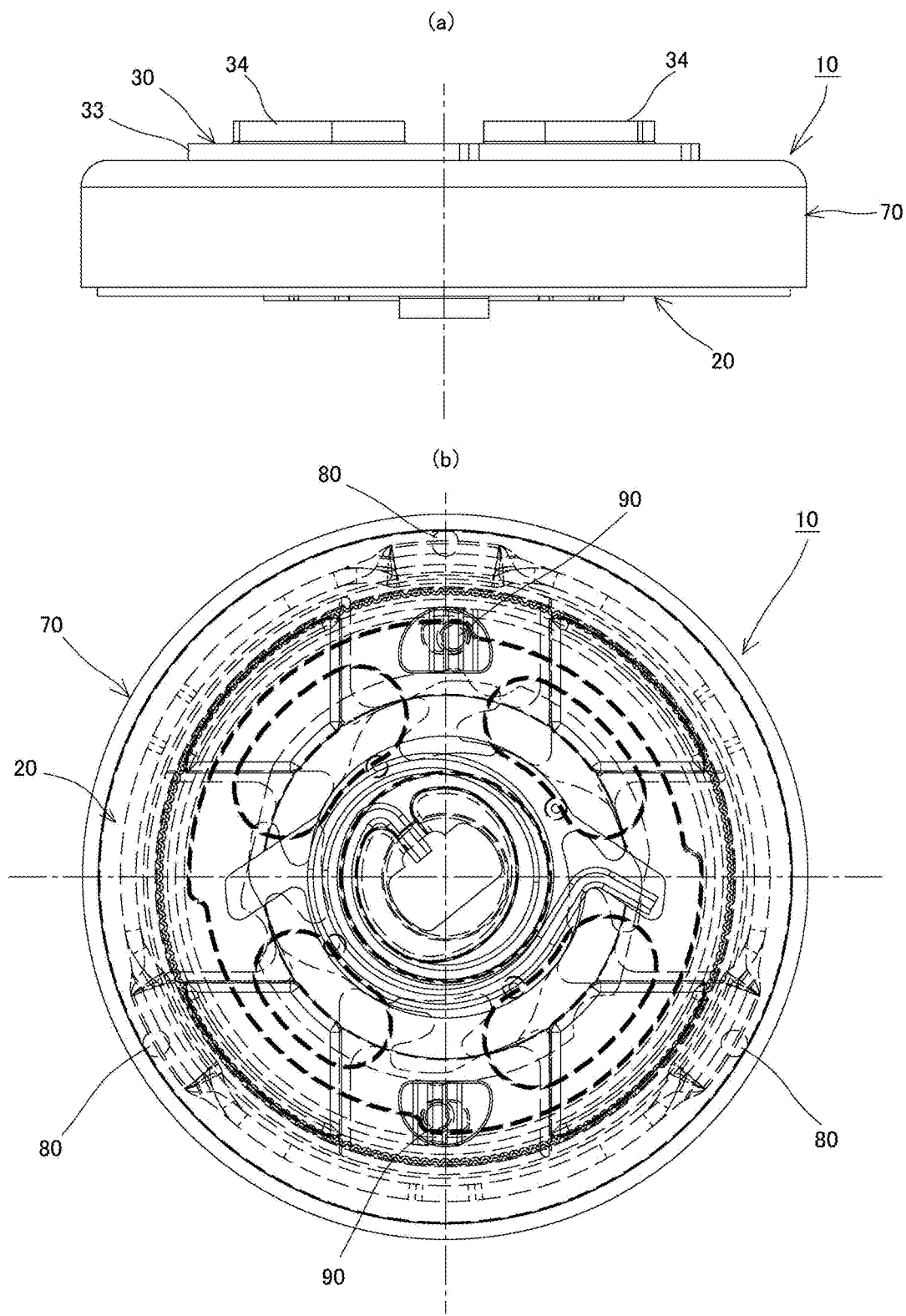
FIG. 2(a) is a side view of the seat reclining device according to the embodiment of the present invention.
FIG. 2(b) is a plane view of the same seen from the guide bracket side.

The present invention will be hereinafter described in more detail based on embodiments illustrated in the drawings. FIG. 1 to FIG. 6 illustrate a seat reclining device 10 according to one embodiment of the present invention. The seat reclining device 10 is attached between a side frame of a seat cushion frame and a side frame of a seat back frame. As illustrated in FIG. 1 to FIG. 6, the seat reclining device 10 includes a guide bracket 20 and an internal gear 30. For example, the guide bracket 20 is fixed to the vicinity of a rear portion of the side frame of the seat cushion frame, and the internal gear 30 is fixed to the vicinity of a lower portion of the side frame of the seat back frame.

The guide bracket 20 is formed in a disk shape, and on its outer surface, coupling projections 21, 21 projecting outward are formed at positions facing each other at an 180 degree interval across the rotation center of the guide bracket 20 and the internal gear 30, and these coupling projections 21, 21 are coupled to the side frame of, for example, the seat cushion frame. At the center, an arrangement hole 22 with a predetermined diameter where to arrange a spiral spring 40 is penetratingly formed. In an inner peripheral surface of the arrangement hole 22, a fitting groove 22a is provided at least at one place, and an outer end portion 41 of the spiral spring 40 is fit in any of the fitting grooves 22a.

On an inner surface of the guide bracket 20 (surface facing the internal gear 30), four guide wall portions 23a to 23d are projectingly arranged in the circumferential direction at equal intervals, and later-described lock plates 60A to 60D are disposed in four guide groove portions 23f to 23i between the adjacent guide wall portions 23a and 23b, 23b and 23c, 23c and 23d, and 23d and 23a and slide in the radial direction along the guide groove portions 23f to 23i respectively.

The internal gear 30 is circular in a plane view and has a substantially concave cross section, has internal teeth 32 on an inner peripheral surface of its concave portion 31, and is disposed with the concave portion 31 facing the inner surface of the guide bracket 20. On an outer surface of the internal gear 30, a circular large-diameter projection 33 projecting outward is provided, and a plurality of coupling projections 34 projecting further outward from an outer surface of the circular large-diameter projection 33 are arranged in the circumferential direction. The internal gear 30 is coupled to the side frame of, for example, the seat back frame via the coupling projections 34.

The guide bracket 20 and the internal gear 30 are aligned using a mounting ring 70 while the inner surface of the guide bracket 20 and the concave portion 31 of the internal gear 30 are made to face each other and an end surface of a peripheral wall 31a of the concave portion 31 is made to abut on the inner surface of the guide bracket 20. The mounting ring 70 is formed of a metal plate worked into a circular ring shape in a plane view, and has a ring-shaped bottom surface portion 71 and a peripheral surface portion 72 rising from an outer peripheral edge of the ring-shaped bottom surface portion 71. In other words, the mounting ring 70 has the peripheral surface portion 72 and the ring-shaped bottom surface portion 71 bent inward and projecting from one edge of the peripheral surface portion 72.

The mounting ring 70 is mounted from, in this embodiment, the outer surface side of the internal gear 30 such that its peripheral surface portion 72 faces outer peripheral surfaces of the internal gear 30 and the guide bracket 20, in a state where the inner surface of the guide bracket 20 and the concave portion 31 of the internal gear 30 face each other and in its inner space, the spiral spring 40, a cam 50, and a lock mechanism including the lock plates 60A to 60D are housed. As a result of the assembling in this manner, the circular large-diameter projection 33 is exposed to the outside of an inner peripheral circle 71a of the ring-shaped bottom surface portion 71 since the inner peripheral circle 71a of the ring-shaped bottom surface portion 71 has an inside diameter about equal to the outside diameter of the circular large-diameter projection 33 of the internal gear 30 and is formed large enough for the circular large-diameter projection 33 to be inserted therethrough. After the mounting ring 70 is mounted in this manner, its peripheral surface portion 72 is fixed to the outer peripheral surface of the guide bracket 20 by welding. Accordingly, when the seat back turns relatively to the seat cushion in a state where the coupling projections 21 of the guide bracket 20 are fixedly coupled to the side frame of, for example, the seat cushion and the coupling projections 34 of the internal gear 30 are fixedly coupled to the side frame of, for example, the seat back, the guide bracket 20 and the internal gear 30 rotate relatively to each other. The mounting ring 70 rotates together with the guide bracket 20 relatively to the internal gear 30, the radial-direction movement of the internal gear 30 is restricted by the peripheral surface portion 72 of the mounting ring 70, and the axial-direction movement of the internal gear 30 is restricted by the ring-shaped bottom surface portion 71.

Figure 3:
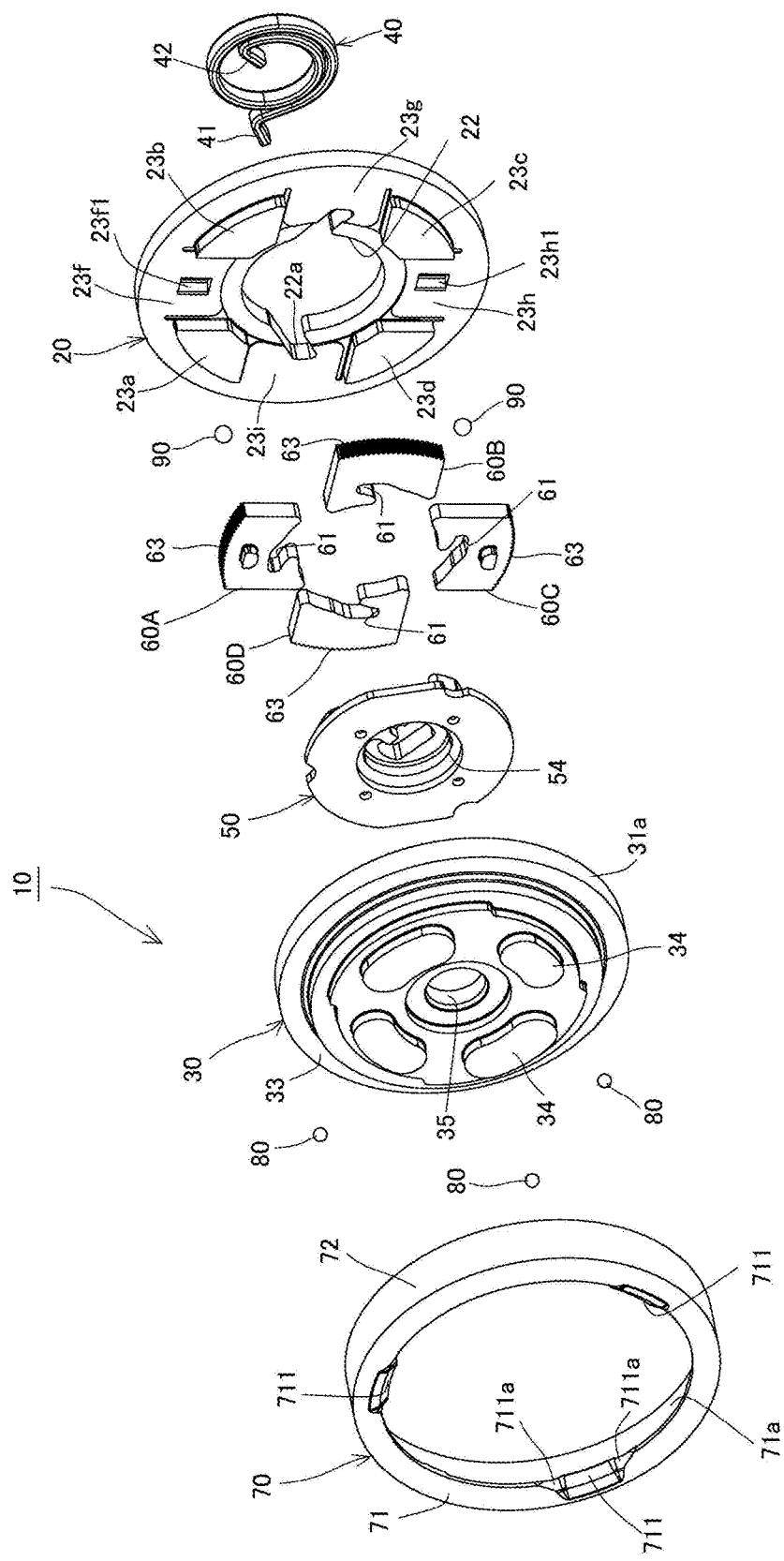
FIG. 3 is an exploded perspective view of the seat reclining device according to the embodiment of the present invention seen from one side.
Figure 4:
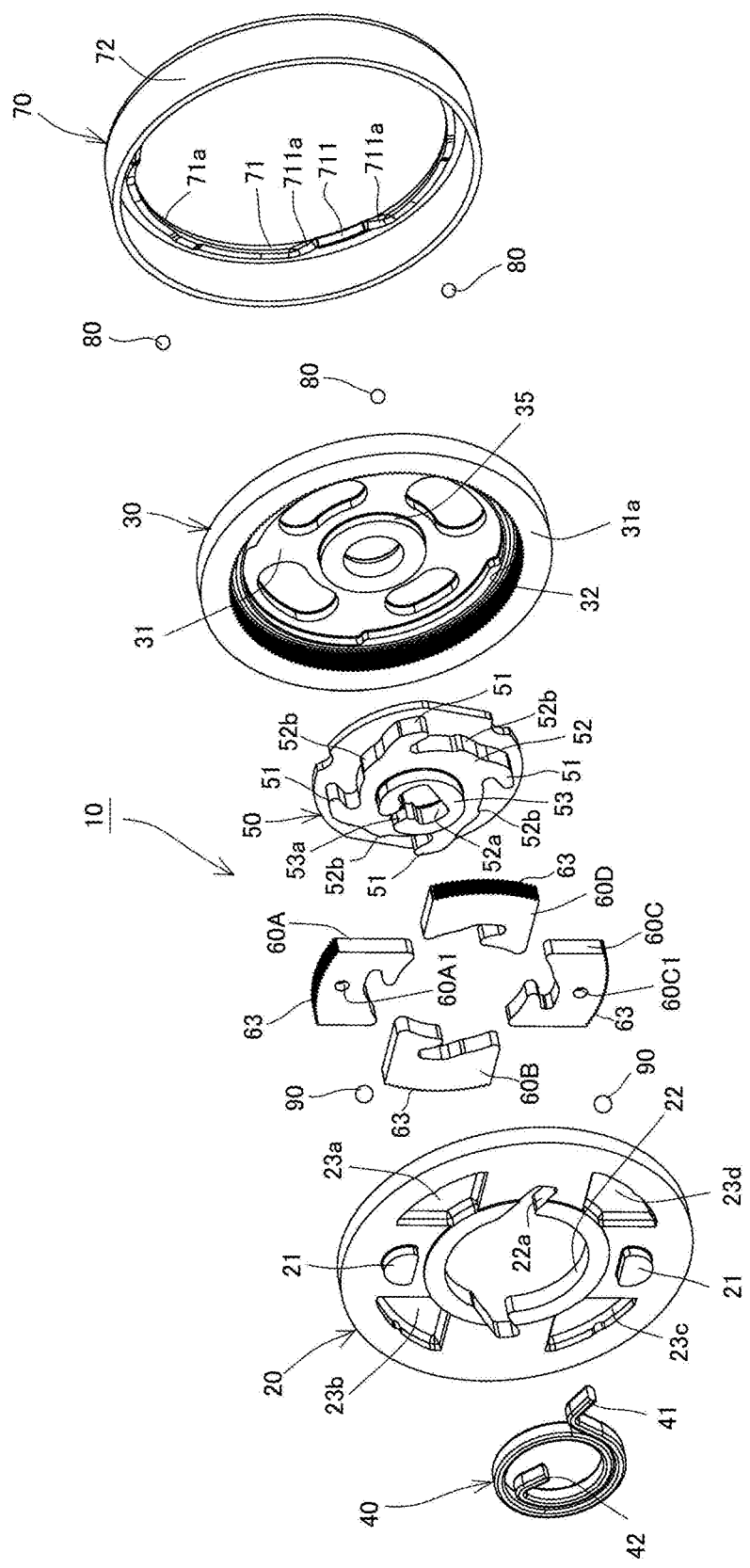
FIG. 4 is an exploded perspective view of the seat reclining device according to the embodiment of the present invention seen from the other side.
Figure 6:
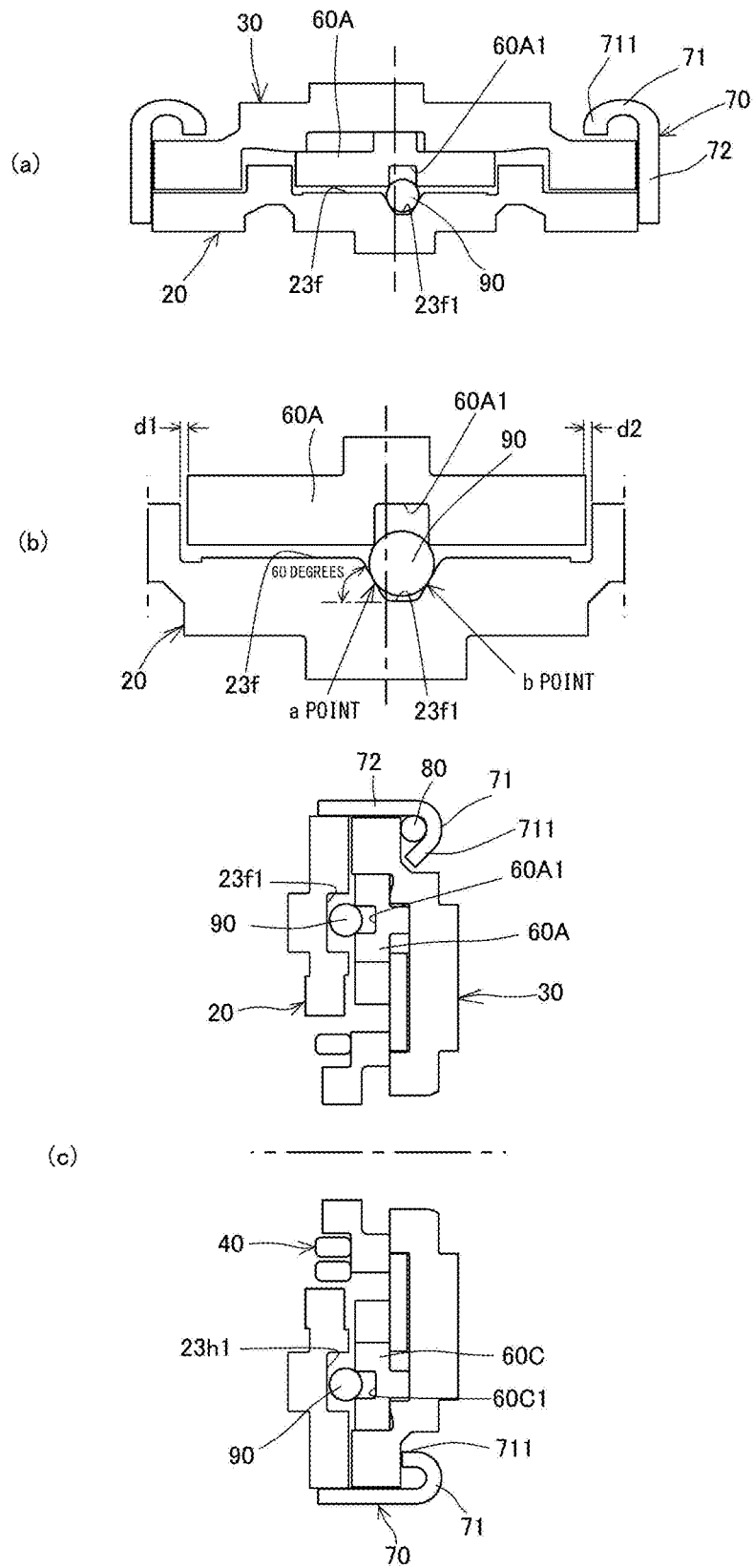
FIG. 6(a) is a sectional view taken along the A-A line in FIG. 5.
FIG. 6(b) is an enlarged view of the vicinity of a place where an inner rolling member is disposed, in FIG. 6(a)
FIG. 6(c) is a sectional view taken along the B-B line in FIG. 5.

As illustrated in FIG. 3, FIG. 4, FIG. 6, and so on, the mounting ring 70 has an inward bent portion 711 formed by bending the ring-shaped bottom surface portion 71 of the mounting ring 70 inward from the peripheral surface portion 72 side, and a plurality of outer rolling members 80 each made of a metal ball such as a steel ball are supported on an inner side of the inward bent portion 711 along the circumferential direction. The number of the arranged outer rolling members 80 is not limited, but they are preferably arranged at a plurality of places in the circumferential direction at substantially equal intervals (in this embodiment, at three places in the circumferential direction at substantially equal intervals). Then, in the ring-shaped bottom surface portion 71, at circumferential-direction both sides sandwiching each of the outer rolling members 80, restricting portions 711a, 711a deformed inward from the outer surface are formed to restrict a circumferential-direction rolling range of each of the outer rolling members 80.

Figure 5:
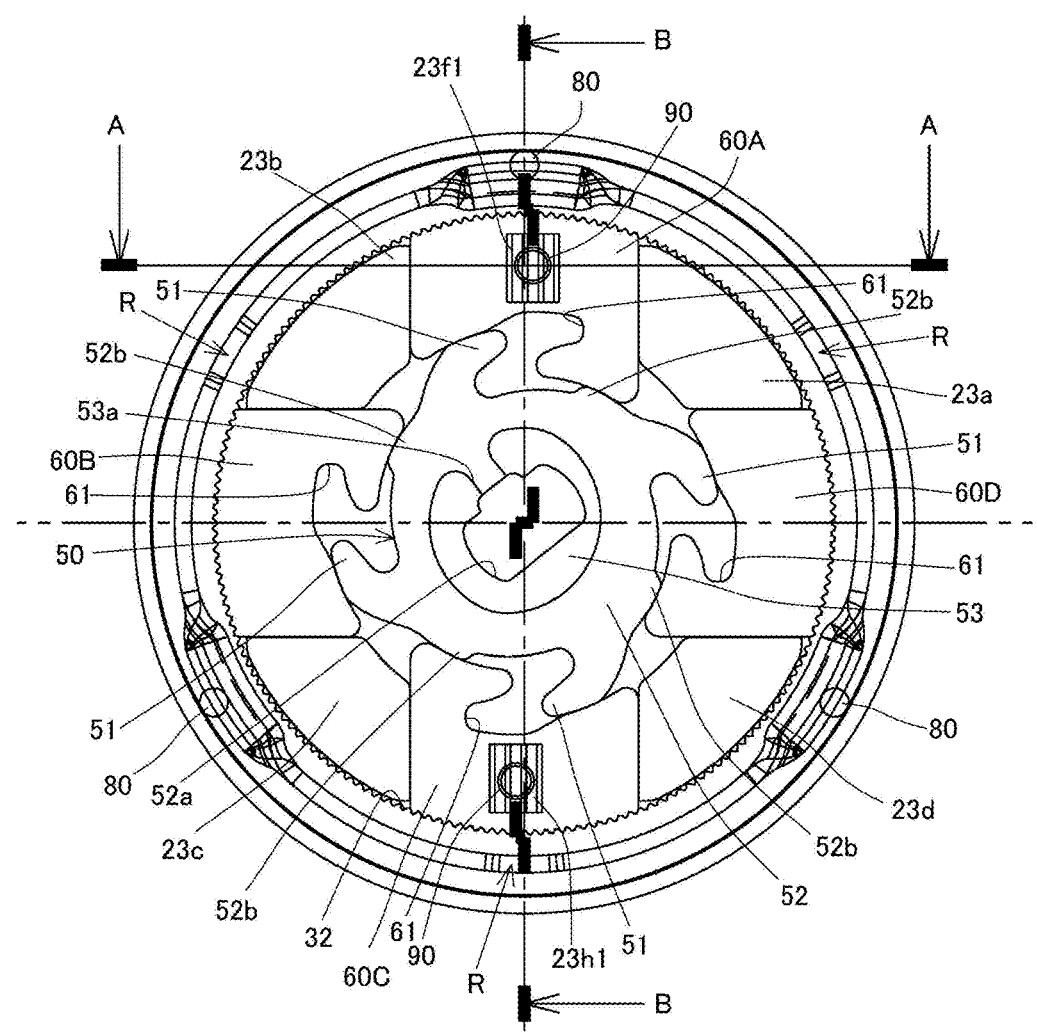
FIG. 5 is a plane view of the seat reclining device according to the embodiment of the present invention seen from the guide bracket side.

As illustrated in FIG. 4, FIG. 5, and so on, on the cam 50, four fitting projections 51, 51 in a substantially are shape extending like a horn are arranged in the circumferential direction at equal intervals so as to correspond to the lock plates 60A to 60D whose number is four in this embodiment. Further, on a main body portion 52 of the cam 50 excluding the fitting projections 51, 51, stepped portions 52b, 52b bulging so as to increase the outside diameter are formed at four positions a predetermined angle apart from base portions of the respective fitting projections 51, 51. At the center of the cam 50, a flat center hole 52a where to insert a shaft portion of an operation member (not illustrated) for reclining operation is penetratingly formed, and when the operation member is operated so as to rotate in a positive or reverse direction, the cam 50 follows this rotation to rotate in the same direction.

The cam 50 has, on its surface facing the guide bracket 20, a first shaft portion 53 projecting from around the flat center hole 52a toward the guide bracket 20 (refer to FIG. 5). The first shaft portion 53 has an outside diameter smaller than the inside diameter of the spiral spring 40, and has a fitting groove 53a cut out from its outer peripheral surface in the center direction. The spiral spring 40 is disposed around an outer periphery of the first shaft portion 53, has its inner end portion 42 fit in the fitting groove 53a of the first shaft portion 53, and is disposed in the arrangement hole 22 of the guide bracket 20 together with the first shaft portion 53. Then, as described above, the outer end portion 41 of the spiral spring 40 is fit in the fitting groove 22a formed in the inner peripheral surface of the arrangement hole 22 of the guide bracket 20. Accordingly, when the inner end portion 42 is fit in the fitting groove 53a, the spiral spring 40 biases the cam 50 in one rotation direction.

The internal gear 30 has, at its center, a second shaft portion 35 projecting toward the cam 50, and the cam 50 is rotatably supported with this second shaft portion 35 inserted to a shaft receiving hole 54 formed in the cam 50 (refer to FIG. 3 and FIG. 4).

The number of the lock plates 60A to 60D used in this embodiment is four. The four lock plates 60A to 60D correspond to the four horn-shaped fitting projections 51, 51 formed in the cam 50, have such a width as to be fit between the adjacent guide wall portions 23a and 23b, 23b and 23c, 23c and 23d, and 23d and 23a with as small operation clearances (operation clearances in the circumferential direction (that is, the rotation direction) d1, d2 (refer to FIG. 6(b) and FIG. 11(b)) as possible, and are slidable on the guide groove portions 23f to 23i along the radial direction of the guide bracket 20 while being guided by side surfaces of the guide wall portions 23a to 23d adjacent thereto.

The lock plates 60A to 60D and the cam 50 may have any shapes as long as the lock plates 60A to 60D are biased outward in the radial direction when the cam 50 is rotated in one direction (in FIG. 5, anticlockwise) by the elasticity of the spiral spring 40, and the lock plates 60A to 60D can displace in the center direction when the cam 50 is rotated in the reverse direction (in FIG. 5, clockwise) by the operation member. In this embodiment, the lock plates 60A to 60D each have a substantially rectangular shape in a plane view, and fitting grooves 61, 61 cut out in a substantially arc shape clockwise in FIG. 5 from the inner peripheral surface are provided in the lock plates 60A to 60D because the horn-shaped fitting projections 51, 51 are formed in the cam 50. When the cam 50 rotates clockwise in FIG. 5, the fitting projections 51, 51 are fit in the respective fitting grooves 61, 61 to pull the lock plates 60A to 60D in the center direction. When the cam 50 is biased by the spiral spring 40 to rotate anticlockwise in FIG. 5, the fitting projections 51, 51 and the stepped portions 52b, 52b press the lock plates 60A to 60D outward in the radial direction. External teeth 63, 63 are formed on outer peripheral surfaces of the lock plates 60A to 60D, and when the lock plates 60A to 60D are pressed outward in the radial direction, the external teeth 63, 63 are engaged with the internal teeth 32 of the internal gear 30, so that the guide bracket 20 and the internal gear 30 are locked so as to be unable to rotate relatively to each other (state in FIG. 5).

Here, in this embodiment, out of the four lock plates 60A to 60D, the two lock plates 60A, 60C which face each other at an 180 degree interval across the rotation center of the guide bracket 20 and the internal gear 30 have support grooves (plate-side support grooves) 60A1, 60C1 formed on their one-side opposed surfaces (in this embodiment, surfaces facing the guide groove portions 23f, 23h of the guide bracket 20) (refer to FIG. 4 and FIG. 6). In the guide groove portions 23f, 23h of the guide bracket 20, support grooves (bracket-side support grooves) 23f1, 23h1 are formed at positions facing the plate-side support grooves 60A1, 60C1 (refer to FIG. 3, FIG. 5, and FIG. 6).

Inner rolling members 90 each made of a metal ball such as a steel ball are disposed, being sandwiched by the plate-side support grooves 60A1, 60C1 and the bracket-side support grooves 23f1, 23h1. Further, the plate-side or bracket-side support grooves, in this embodiment, the bracket-side support grooves 23f1, 23h1 are formed to have a radial-direction (direction along the radius or diameter of the guide bracket 20) length larger than the diameter of the inner rolling members 90 (refer to FIG. 3, FIG. 5, and FIG. 6), whereby the inner rolling members 90 can relatively displace in the bracket-side support grooves 23f1, 23h1 in the radial direction. Further, as illustrated in FIG. 6(b), cross sections of the bracket-side support grooves 23f1, 23h1 along a groove width direction which is a direction perpendicular to the radial direction each preferably have a substantially V-shape. In this embodiment, the bracket-side support grooves 23f1, 23h1 are groove portions each with the substantially V-shaped cross section formed such that a groove width thereof along the surface of the guide groove portion 23f, 23h is slightly wider than the diameter of the inner rolling member 90, while the width becomes gradually narrower as it goes in a depth direction (thickness direction of the guide bracket 20) and from the middle, the width becomes narrower than the diameter of the inner rolling member 90, so that only an about a lower half of the inner rolling member 90 is housed in the groove portion. Consequently, the inner rolling members 90 are two-point supported on inclined surfaces of the bracket-side support grooves 23f1, 23h1 each having the substantially V-shaped cross section, at an "a" point and a "b" point which are located on both sides when seen in the cross section taken along the groove width direction that substantially agrees with a cross section taken along the circumferential direction of the guide bracket 20, and partly project outward from the bracket-side support grooves 23f1, 23h1 (refer to FIG. 6(b)). Therefore, the inner rolling members 90 are each sandwiched by the two points, namely, the "a" point and the "b" point, which restricts their rolling in the circumferential direction even though they are allowed to roll in the radial direction along the bracket-side support grooves 23f1, 23h1. Consequently, on both sides of the four lock plates 60A to 60D between the adjacent guide wall portions 23a and 23b, 23b and 23c, 23c and 23d, and 23d and 23a, the small operation clearances d1, d2 can be maintained (refer to FIG. 6(b) and FIG. 11(b)).

Incidentally, in the bracket-side support grooves 23f1, 23h1, an angle of inclination of their inclined surfaces or their diameter or depth are set so as to make the inner rolling members 90 partly project from the bracket-side support grooves 23f1, 23h1 when the inner rolling members 90 are disposed in the bracket-side support grooves 23f1, 23h1. Consequently, in the assembled state, the internal gear 30 is sandwiched between the inner rolling members 90 and the aforesaid outer rolling members 80.

Figure 7:
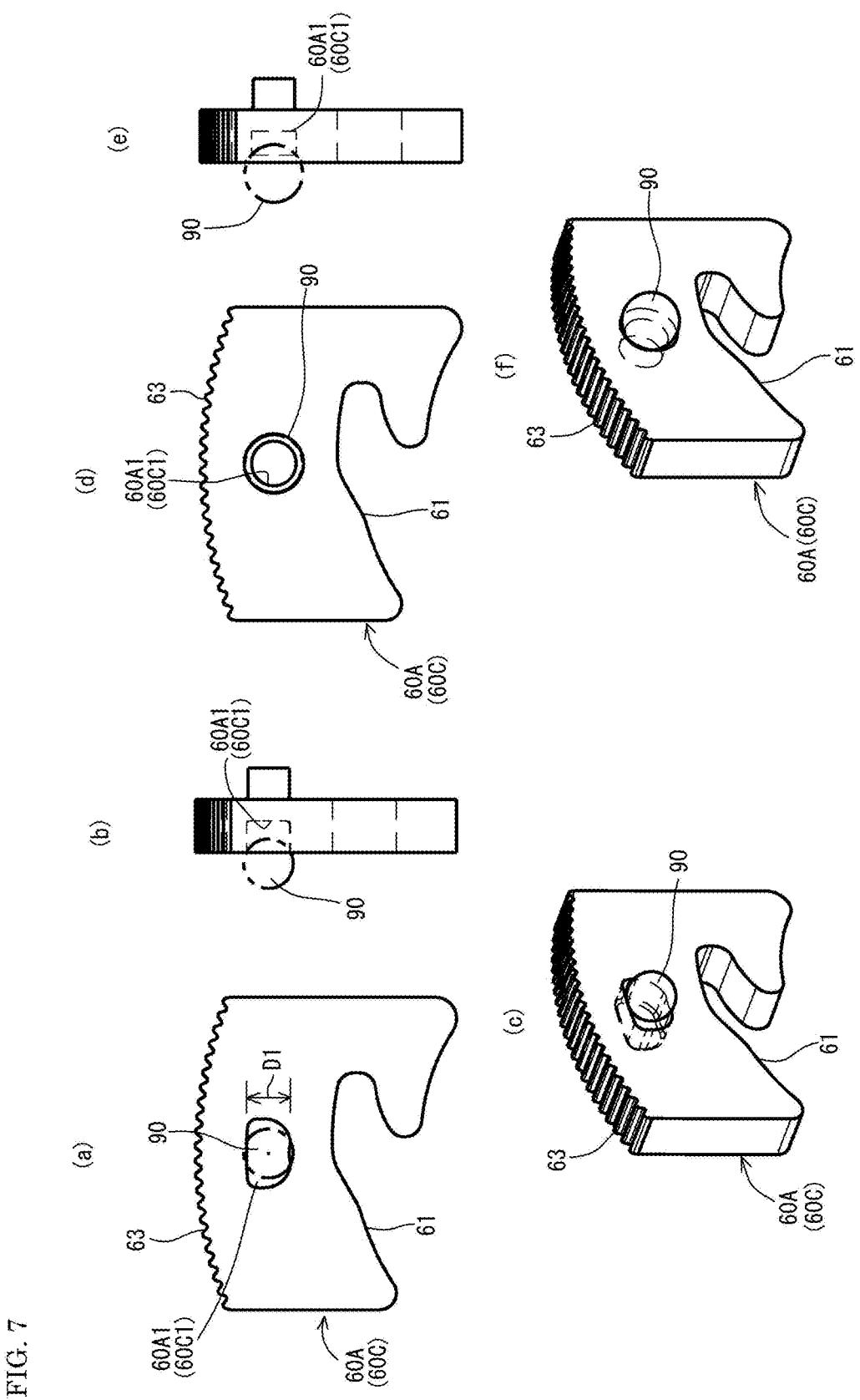
FIGS. 7(a) to (c) are views illustrating an arrangement relation between a lock plate including a plate-side support groove according to one example and the rolling member, (a) being a plane view of the lock plate, (b) being a side view of the lock plate, and (c) being a perspective view thereof.
FIGS. 7(d) to (f) are views illustrating an arrangement relation between the lock plate including a plate-side support groove according to another example and the rolling member, (d) being a plane view of the lock plate, (e) being a side view of the lock plate, and (f) being a perspective view thereof.

The plate-side support grooves 60A1, 60C1 may have any shape as long as the plate-side support grooves 60A1, 60C1 are in contact with portions, of the inner rolling members 90, protruding from the bracket-side support grooves 23f1, 23h1 as illustrated in FIG. 6, and the inner rolling members 90 can roll in the radial direction along the bracket-side support grooves 23f1, 23h1. For example, they are formed in the shape illustrated in FIGS. 7(a) to (c), that is, their length along the circumferential direction is larger than the diameter of the inner rolling members 90, their groove width DI in the radial direction is less than the diameter of the inner rolling members 90, and the inner rolling members 90 are capable of rolling while in point contact with peripheral edge portions of the plate-side support grooves 60A1, 60C1. Alternatively, they are formed in the shape illustrated in FIGS. 7(d) to (f), that is, they are in a circular shape smaller in diameter than the inner rolling members 90, and the inner rolling members 90 are capable of rolling while in line contact with the peripheral edge portions of the plate-side support grooves 60A1, 60C1. In this embodiment, the plate-side support grooves 60A1, 60C1 are formed in the same shape as the shape illustrated in FIGS. 7(d) to (f), out of the above-described shapes.

According to this embodiment, the internal gear 30 is in such a positional relation as to be sandwiched between the outer rolling members 80 and the inner rolling members 90, the inner rolling members 90 protrude from the bracket-side support grooves 23f1, 23h1, and the outer rolling members 80 are supported between the outer surface of the internal gear 30 and the ring-shaped bottom surface portion 71 of the mounting ring 70 whose peripheral surface portion 72 is fixed to the outer peripheral surface of the guide bracket 20. Accordingly, both in the locked state and in the unlocked state, pressing force of the outer rolling members 80 and the inner rolling members 90 acts in the stacking direction (axial direction) of the members. Further, the outer rolling members 80 are supported on the inner side of the inward bent portion 711 of the ring-shaped bottom surface portion 71 of the mounting ring 70, and the peripheral surface portion 72 is fixed to the outer peripheral surface of the guide bracket 20, and in addition, the mounting ring 70 is formed of the worked metal plate as described above, so that spring force of the ring-shaped bottom surface portion 71 and the peripheral surface portion 72 acts as counteraction of the aforesaid pressing force. As a result, the force acts in the direction in which the inner rolling members 90 located between the guide bracket 20 and the internal gear 20 approach the outer rolling members 80, that is, in the stacking direction. This force acts constantly, that is, both in the locked state and in the unlocked state, to enhance rigidity of the seat reclining device 20. Accordingly, in the locked state, the occurrence of wobbling and a strange noise ascribable to an operation clearance in the stacking direction (axial direction) is eliminated.

Further, in this embodiment, since the aforesaid pressing force and spring force in the stacking direction (axial direction) are made to act at a plurality of places in the circumferential direction using the three outer rolling members 80 and the two inner rolling members 90, these forces as a result restrict the displacement of the lock plates 60A to 60D in the circumferential direction, so that the circumferential-direction displacement in the locked state and the wobbling due to this displacement are reduced. Further, at the time of the unlocking, even though the operation clearance is small owing to such forces in the stacking direction, an idling torque of the internal gear 30 can be reduced to ensure its smooth operation because the outer rolling members 80 relatively roll on the outer surface of the internal gear 30, and accordingly friction between the internal gear 30 and the outer rolling members 80 is rolling friction and frictional resistance between the internal gear 30 and the mounting ring 70 at the time of the rotation becomes small.

Further, since the inner rolling members 90 are supported at two points in the plate-side support grooves 60A1, 60C1 each having the substantially V-shaped cross section, at the time of the locking from the unlocked state, even though the operation clearance in the stacking direction is small owing to the aforesaid force in the stacking direction (axial direction), the lock plates 60A, 60C are capable of smoothly operating in the radial direction with a small resistance because the frictional force becomes the rolling friction owing to the rolling of the inner rolling members 90. This results in good responsiveness of the locking operation and the unlocking operation.

On the other hand, owing to the two-point support of the inner rolling members 90 in the plate-side support grooves 60A1, 60C1 each having the substantially V-shaped cross section, even in the locked state where the external teeth 63, 63 of the lock plates 60A to 60D are engaged with the internal teeth 32 of the internal gear 30, the operation clearances d1, d2 (refer to FIG. 6(b), FIG. 11(b), and FIG. 12(b)) in the circumferential direction present on both sides of each of the lock plates 60A to 60D are kept as they are, and even if the external force causing the mutual rotation of the guide bracket 20 and the internal gear 30 is applied, the movement of the lock plates 60A to 60D in the circumferential direction is restricted by the inner rolling members 90, and as a result, in the locked state, the lock plates 60A to 60D are inhibited from abutting on the side surfaces of the guide wall portions 23a to 23d adjacent thereto and making a strange noise. Specifically, when the external force causing the mutual rotation of the guide bracket 20 and the internal gear 30 is applied by the weight of a person or the like at the time of the locking, the inner rolling members 90 are pressed against the one-side inclined surfaces of the bracket-side support grooves 23f1, 23h1 each having the substantially V-shaped cross section and try to displace along the inclined surfaces against which they are pressed, in the direction in which they separate from the bracket-side support grooves 23f1, 23h1, but because of the pressing in the stacking direction, a displacement amount in the circumferential direction is as a result restricted within a small range. By setting the angle of inclination of the inclined surfaces or the like so as to make this displacement amount in the circumferential direction smaller than the operation clearances d1, d2 in the circumferential direction, it is possible to inhibit the lock plates 60A to 60D from abutting on the side surfaces of the guide wall portions 23a to 23d adjacent thereto even if the external force is applied at the time of the locking.

Therefore, even in a structure having only the inner rolling members 90, it is possible to reduce the wobbling both in the circumferential direction and the stacking direction (thickness direction), though the outer rolling members 80 and the inner rolling members 90 are preferably both included as in the seat reclining device 10 of this embodiment.

Figure 8:
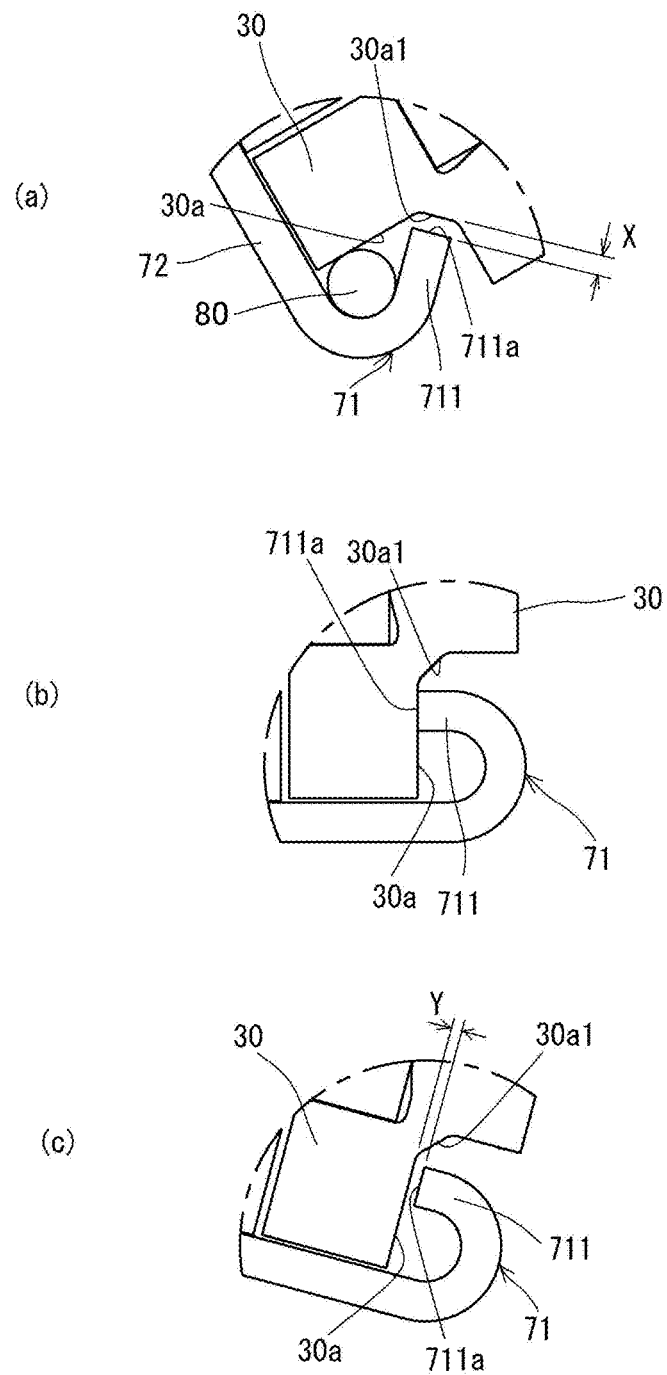
FIGS. 8(a) to (c) are explanatory views of a detailed structure of a mounting ring.

Here, the inward bent portion 711 of the ring-shaped bottom surface portion 710 worked so as to embrace the outer rolling members 80 has a bending angle of several ten degrees (for example, 30 degrees to 60 degrees) at its positions where the outer rolling members 80 are loaded. In this embodiment, as illustrated in FIG. 8(a), there is a clearance X of about 0.3 to 0.5 mm between the inner peripheral end surface 711a of the inward bent portion 711 of the ring-shaped bottom surface portion 71 and an opposed inclined surface 30a1 near an outer surface-side peripheral edge 30a of the facing internal gear 30. Further, at the positions where the outer rolling members 80 are loaded, the inward bent portion 711 of the ring-shaped bottom surface portion 710 has a bending angle of several ten degrees up to its portion abutting on the outer surface of the outer rolling member 80 (refer to FIG. 8(a)), but at positions except the positions where the outer rolling members 80 are loaded, the inner peripheral end surface 711a of the inward bent portion 711 is bent so as to abut on the surface of the outer surface-side peripheral edge 30a at a substantially right angle as illustrated in FIGS. 8(b), (c). In the inward bent portion 711 at the positions except the positions where the outer rolling members 80 are loaded, the inner peripheral end surface 711a abuts on the outer surface-side peripheral edge 30a at some places in the circumferential direction, in this embodiment, at three places which are circumferential-direction substantially middle portions between the adjacent outer rolling members 80, 80 (places indicated by the reference sign "R" in FIG. 5), and at the other portions, there is a slight clearance Y between the inner peripheral end surface 711a and the outer surface-side peripheral edge 30a.

According to this embodiment, in the ring-shaped bottom surface portion 71, the inner peripheral end surface 711a of the inward bent portion 711 partly abuts on the surface of the outer surface-side peripheral edge 30a of the internal gear 30 at a substantially right angle. As a result, the internal gear 30 is pressed not only by the outer rolling members 80 but also by the inward bent portion 711 of the ring-shaped bottom surface portion 71, enabling a further reduction of the wobbling of the internal gear 30 in the thickness direction (the stacking direction of the members). Further, the pressing of the internal gear 30 in the thickness direction is not achieved by a projection protrudingly formed on the ring-shaped bottom surface portion 71 by, for example, doweling, but by the adjustment of the bending angle of the inward bent portion 711, the inner peripheral end surface 711a is made to abut on the outer surface-side peripheral edge 30a of the internal gear 30 at a substantially right angle to press the internal gear 30, and therefore, a section modulus of the portions exhibiting a pressing function is higher as compared with the projection formed by the doweling, and the pressing function is not easily decreased by the relative rotation of the internal gear 30.

Figure 9:
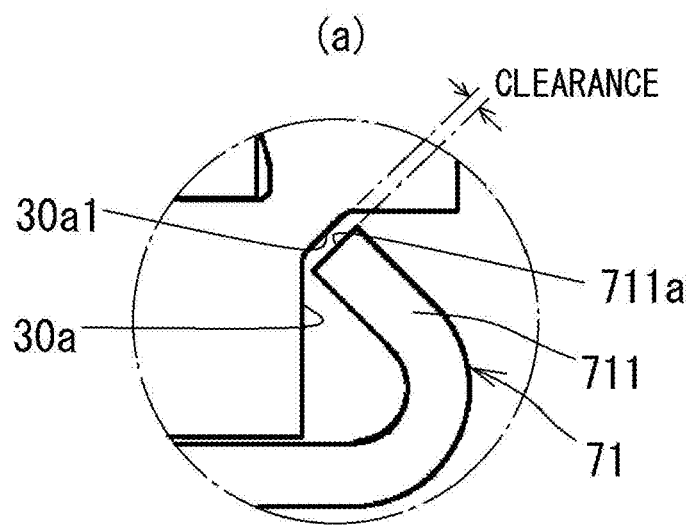
FIGS. 9(a), (b) are explanatory views of a detailed structure in another mode of the mounting ring.
Figure 9:
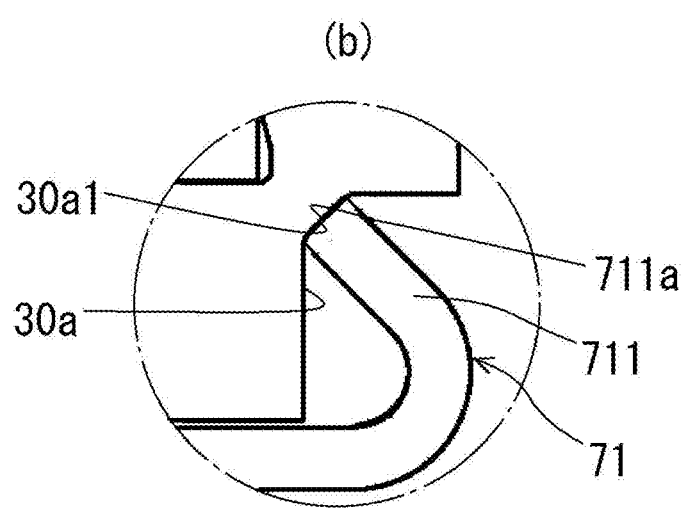

Further, in the mounting ring 70, the inward bent portion 711 of the ring-shaped bottom surface portion 710 worked so as to embrace the outer rolling members 80 has the bending angle of several ten degrees (for example, 30 degrees to 60 degrees) as described above. Here, another possible structure is that, in the state where the inward bent portion 711 faces the opposed inclined surface 30a1 near the outer surface-side peripheral edge 30a of the internal gear 30 as illustrated in FIGS. 9(a), (b) while entirely kept inclined, a clearance between the inner peripheral end surface 711a of the inward bent portion 711 and the opposed inclined surface 30a1 of the internal gear 30 (refer to FIG. 9(a)) is set to about 0.3 to 0.5 mm at normal places, while the inner peripheral end surface 711 protrudes in the direction of the opposed inclined surface 30a1 at some positions in its circumferential direction, with the clearance of about 0.1 to 0.3 mm or 0.1 mm or less (including 0 mm), that is, with substantially no clearance (refer to FIG. 9(b)).

In the above-described structure in which the inner peripheral end surface 711a of the inward bent portion 711 and the opposed inclined surface 30a face each other with the angle of several ten degrees (for example, 30 degrees to 60 degrees), and at some positions, the clearance is narrowed and they can abut on each other with substantially zero clearance therebetween, the function of reducing the wobbling in two directions, namely, the thickness direction (the stacking direction of the members) and the radial direction works on the internal gear 30. That is, in the case where the clearance is very small such as 0.1 to 0.3 mm, the wobbling in the two directions is reduced to the range of the narrow clearance at the largest, and in the case where there is substantially no clearance, the wobbling in the two directions is almost completely eliminated. The portion where the clearance between the inner peripheral end surface 711a of the inward bent portion 711 of the mounting ring 700 and the opposed inclined surface 30a1 of the internal gear 30 is narrow (including the case where there is no clearance) is preferably provided at two to three places in the circumferential direction, and in the case where the outer rolling members 80 are provided at three places in the circumferential direction respectively as described above, the portions with the narrow clearance are more preferably provided at the substantially middle portions in the circumferential direction between the adjacent outer rolling members 80, 80. Consequently, the function of the outer rolling members 80 and the function by the portions with the narrow clearance in the inner peripheral end surface 711a are exhibited at positions well-balanced in the circumferential direction. That is, owing to the outer rolling members 80 further having the function of decreasing a coefficient of friction and the inner peripheral end surface 711a, two kinds of the wobbling reducing functions act.

(Load Test)

Next, regarding the wobbling in the locked state under a varied angle of inclination of the bracket-side support grooves 23f1, 23h1 having the substantially V-shaped cross section, verification was conducted using seat reclining devices 10 of a test example 1 and a test example 2. First, the test was conducted on the seat reclining device 10 (test example 1) having the bracket-side support grooves 23f1, 23h1 of this embodiment illustrated in FIG. 1 to FIG. 6. The bracket-side support grooves 23f1, 23h1 of this embodiment are grooves each with the substantially V-shaped cross section, having the inclined surfaces rising from the groove bottom surface to both sides in the cross section at 60 degrees (refer to FIGS. 6(a), (b)).

Figure 10:
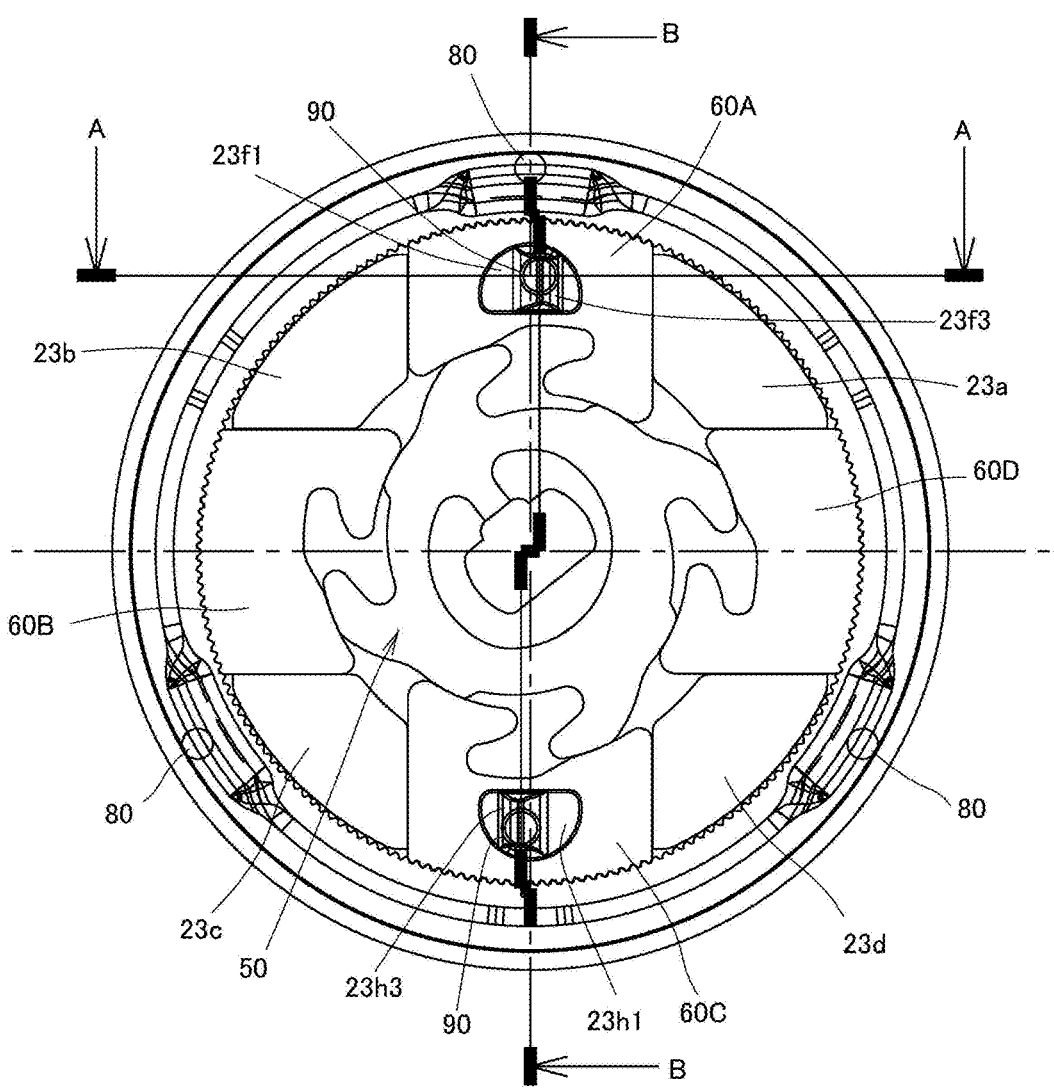
FIG. 10 is a plane view of a seat reclining device according to another embodiment of the present invention seen from a guide bracket side.
Figure 11:
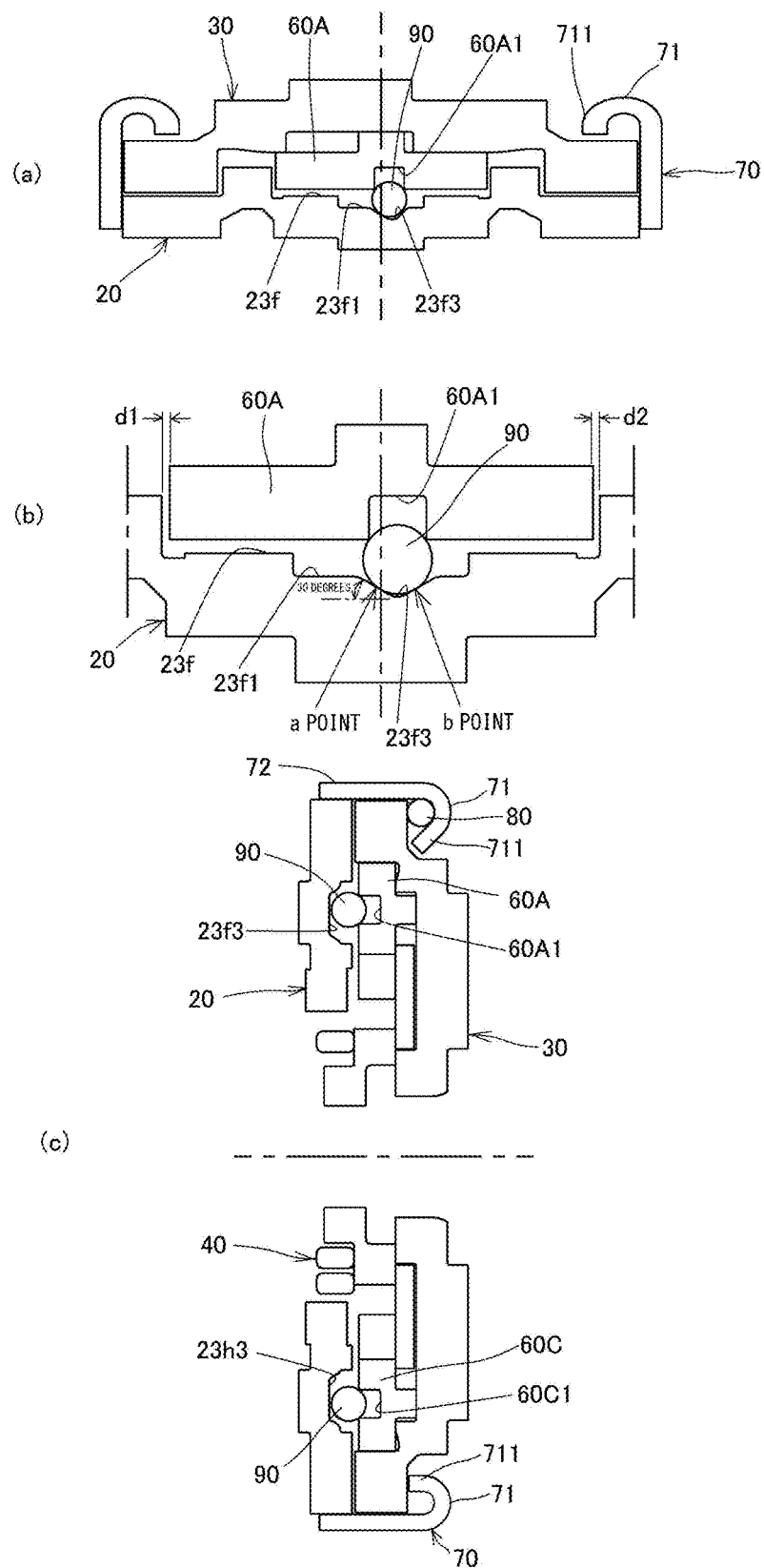
FIG. 11(a) is a sectional view taken along the A-A line in FIG. 10.
FIG. 11(b) is an enlarged view of the vicinity of a place where an inner rolling member is disposed, in FIG. 10(a)
FIG. 11(c) is a sectional view taken along the B-B line in FIG. 10.

On the other hand, as illustrated in FIG. 10 and FIG. 11, in the seat reclining device 10 of the test example 2, the bracket-side support grooves 23f1, 23h1 have a larger width than the diameter of the inner rolling members 90, and near the center portions of the bracket-side support grooves 23f, 23h1, groove portions 23f3, 23h3 each having a substantially V-shaped cross section are formed. In the above-described embodiment, the whole bracket-side support grooves 23f1, 23h1 each correspond to a groove portion whose cross section has a substantially V shape, while, in the test example 2, the groove portions 23f3, 23h3 formed in the bracket-side support grooves 23f1, 23h1 each correspond to the groove portion whose cross section has a substantially V shape. The groove portion whose cross section has the substantially V shape in the claims include either of these forms. In the test example 2, as illustrated in FIG. 11(b), the groove portions 23f3, 23h3 are each formed in a shape including inclined surfaces rising from a groove bottom surface to both sides in the cross section at 30 degrees. Note that, in FIG. 10 and FIG. 11, the other structure is the same as that in the embodiment illustrated in FIG. 1 to FIG. 6 which is the test example 1.

Figure 12:
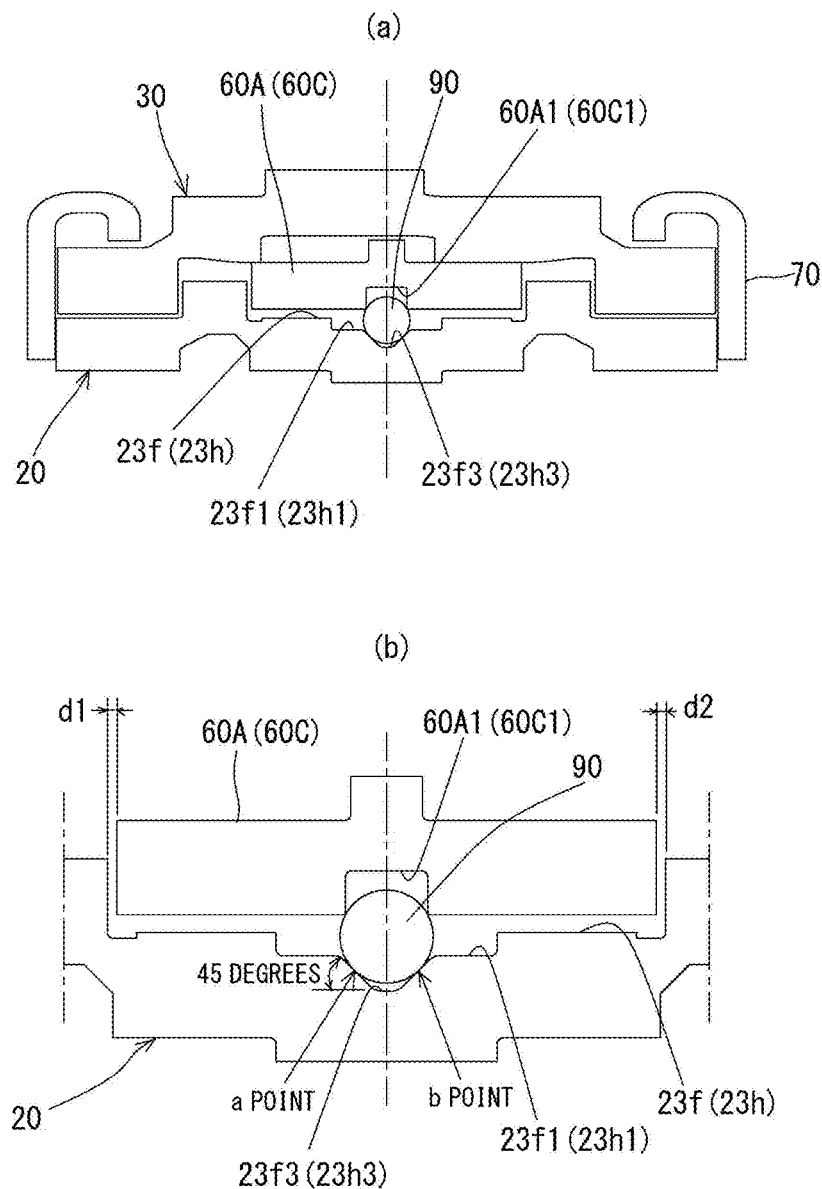
FIG. 12(a) is a sectional view of a seat reclining device according to another embodiment of the present invention, taken along a direction perpendicular to a radial direction.
FIG. 12(b) is an enlarged view of the vicinity of a place where an inner rolling member is disposed, in FIG. 12(a).

FIG. 12 are views illustrating an essential part of a seat reclining device 10 of a test example 3, which basically has the same structure as that of the seat reclining device 10 of the test example 2 and includes the groove portions 23f3, 23h3 which are formed in the bracket-side support grooves 23f1, 23h1 to each constitute the groove portion whose cross section has the substantially V shape. However, the groove portions 23f3, 23h3 are each formed in a shape including the inclined surfaces rising from the groove bottom surface to both sides in the cross section at 45 degrees. Note that, in the test example 3, the groove portions 23f3, 23h3 and the plate-side support grooves 60A1, 60C1 are formed at the center position of the seat reclining device 10, while in the test example 2 in FIG. 11, they are formed at a slightly deviated position, but such a difference does not lead to a difference in the function of the seat reclining device 10 including the function of the inner rolling members 90.

Further, the inner rolling members 90 of the test example 1 are in contact with the bracket-side support grooves 23f1, 23h1 at two points, that is, the "a" point and the "b" point in the sectional view as described above, but the inner rolling members 90 of both of the test example 2 and the test example 3 are in contact with the groove portions 23f3, 23h3 at two points, namely, the "a" point and the "b" point in the sectional view. Therefore, in any of the test examples 1 to 3, the operation clearances d1, d2 in the circumferential direction are provided on both sides of the lock plates 60A to 60D.

Figure 13:
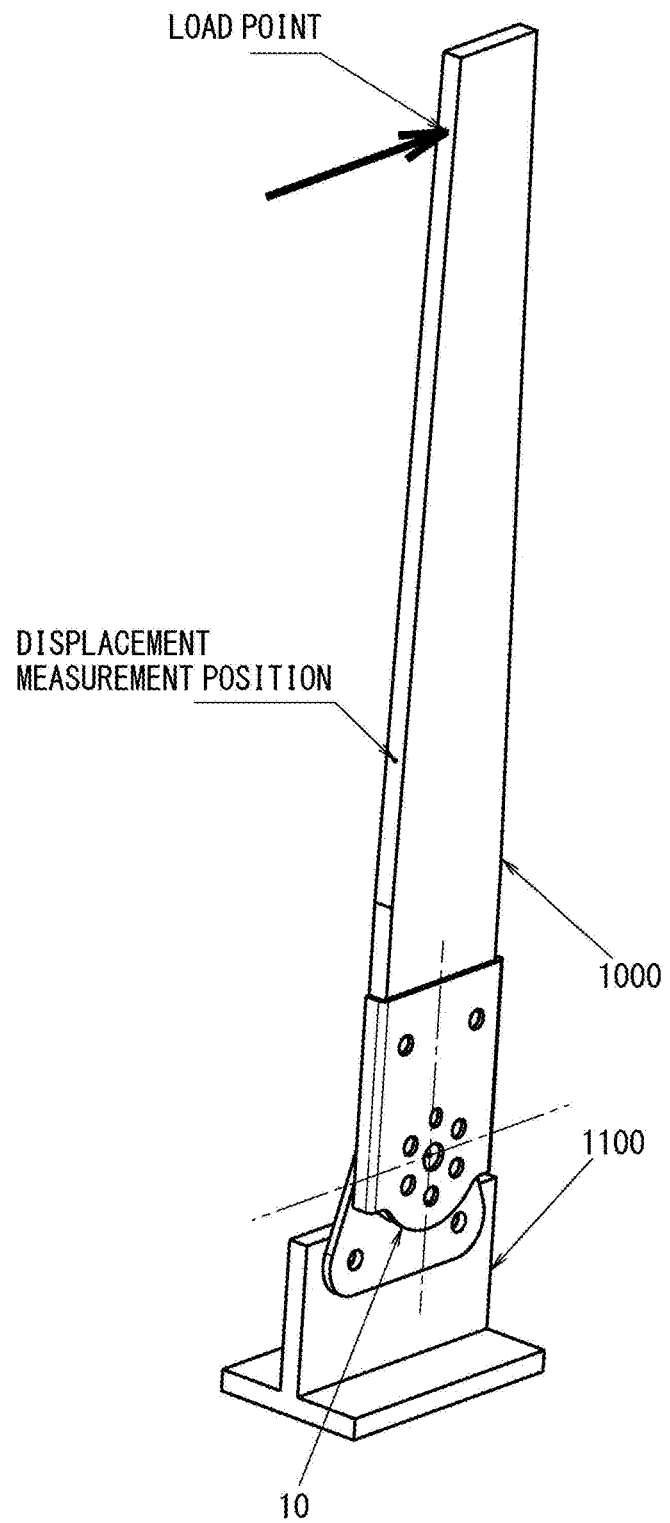
FIG. 13 is an explanatory view of a method of measuring load-displacement characteristics of test examples.

The test was conducted as follows. As illustrated in FIG. 13, the seat reclining device 10 was disposed between a back-side rigid jig 1000 with a predetermined length corresponding to the seat back and a cushion-side rigid jig 1100 assumed to be the seat cushion, with the coupling projections 34 of the internal gear 30 being welded to the back-side rigid jig 1000 and with the coupling projections 21 of the guide bracket 20 being welded to the cushion-side rigid jig 1100, an upper portion (position of the load point in FIG. 13) of the back-side rigid jig 1000 was pushed forward and backward (the rotation direction of the seat reclining device 10 (circumferential direction)), and load-displacement characteristics were measured. A displacement amount was measured at a predetermined position in a substantially middle portion of the back-side rigid jig 1000 (position 200 mm apart upward from the rotation center of the seat reclining device 10 along the back-side rigid jig 1000, which is the displacement measurement position in FIG. 13).

Figure 14:
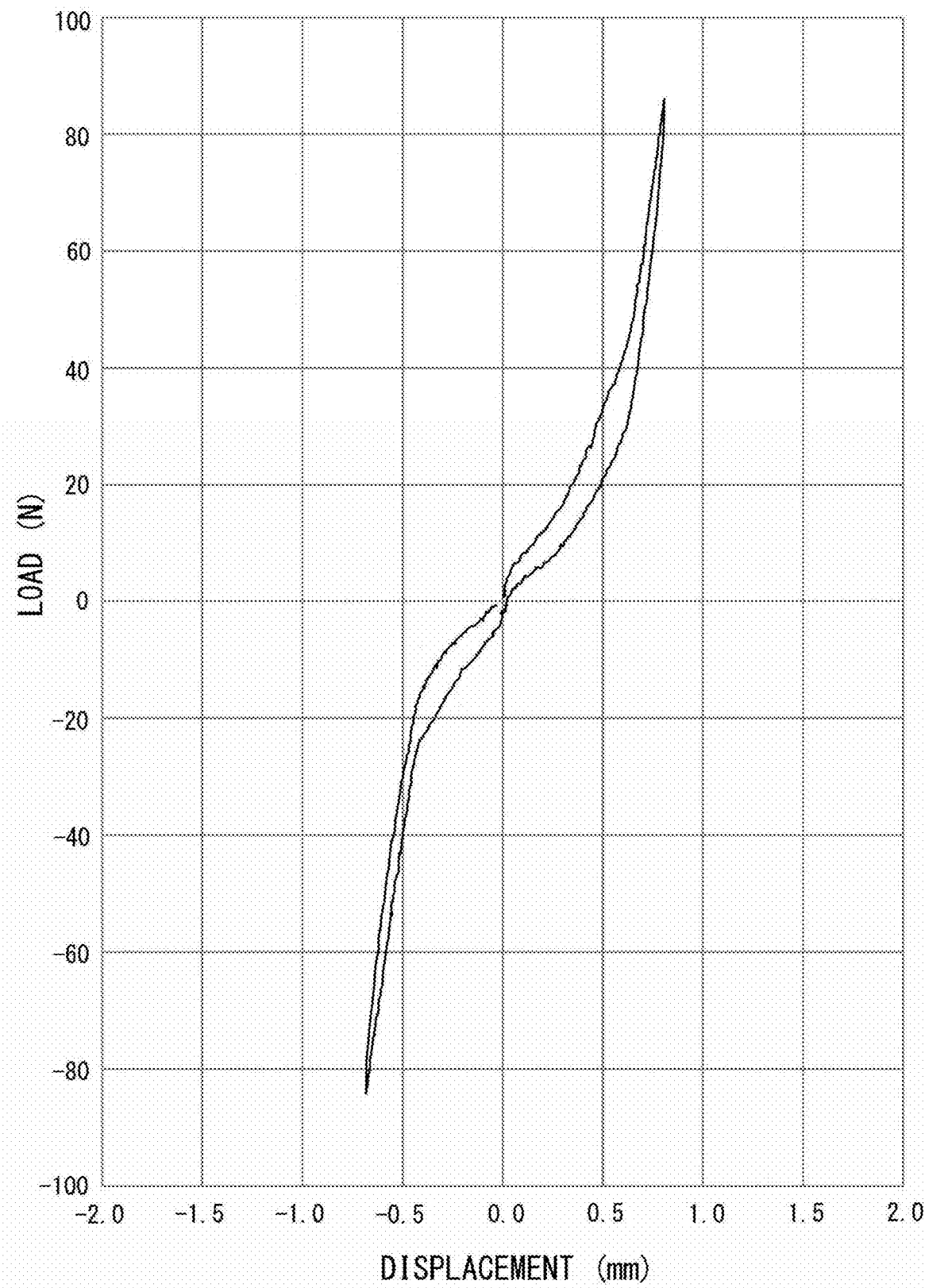
FIG. 14 is a chart illustrating the result of the measurement of the load-displacement characteristic of a test example 1.
Figure 15:
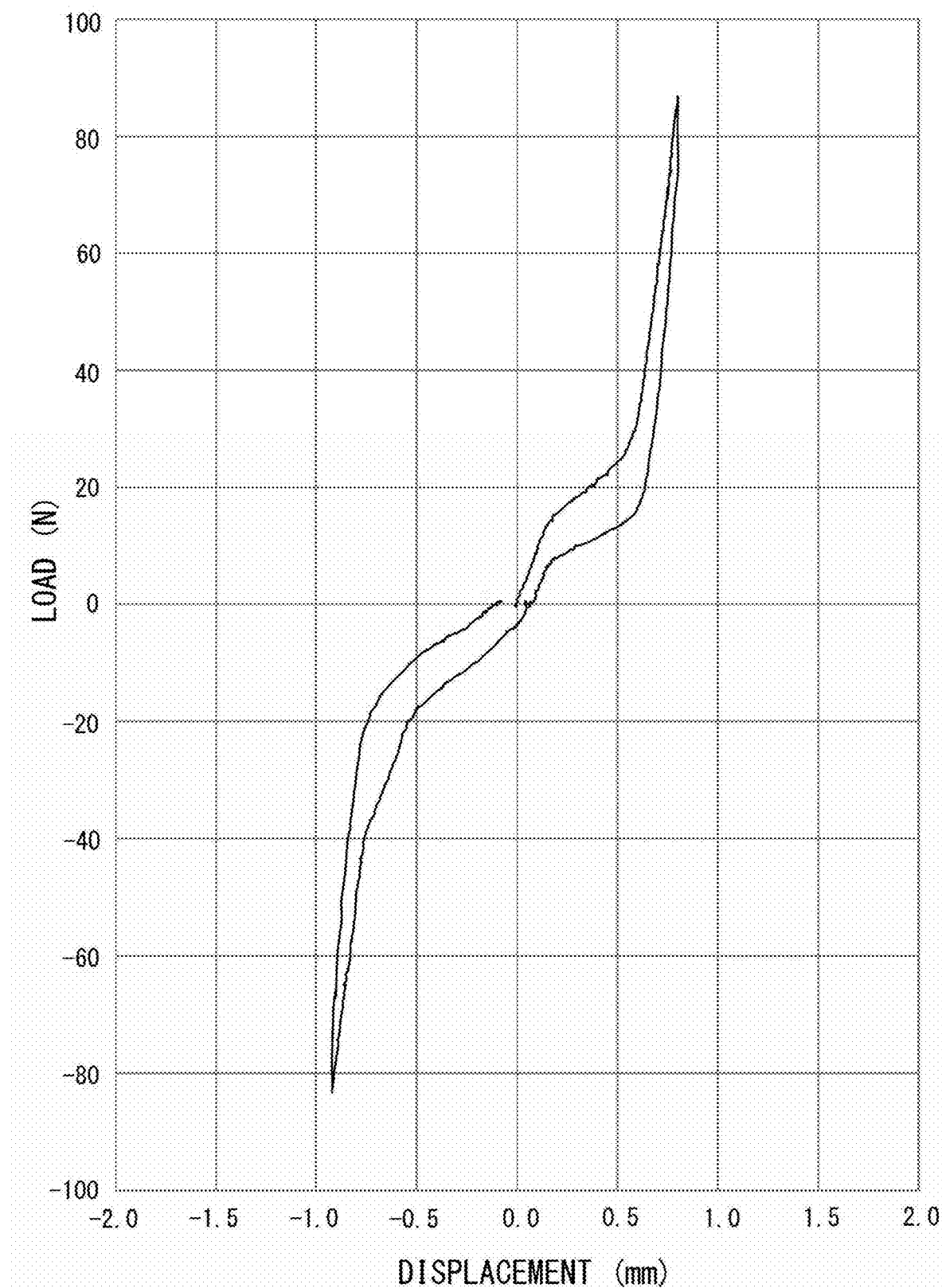
FIG. 15 is a chart illustrating the result of the measurement of the load-displacement characteristic of a test example 2.
Figure 16:
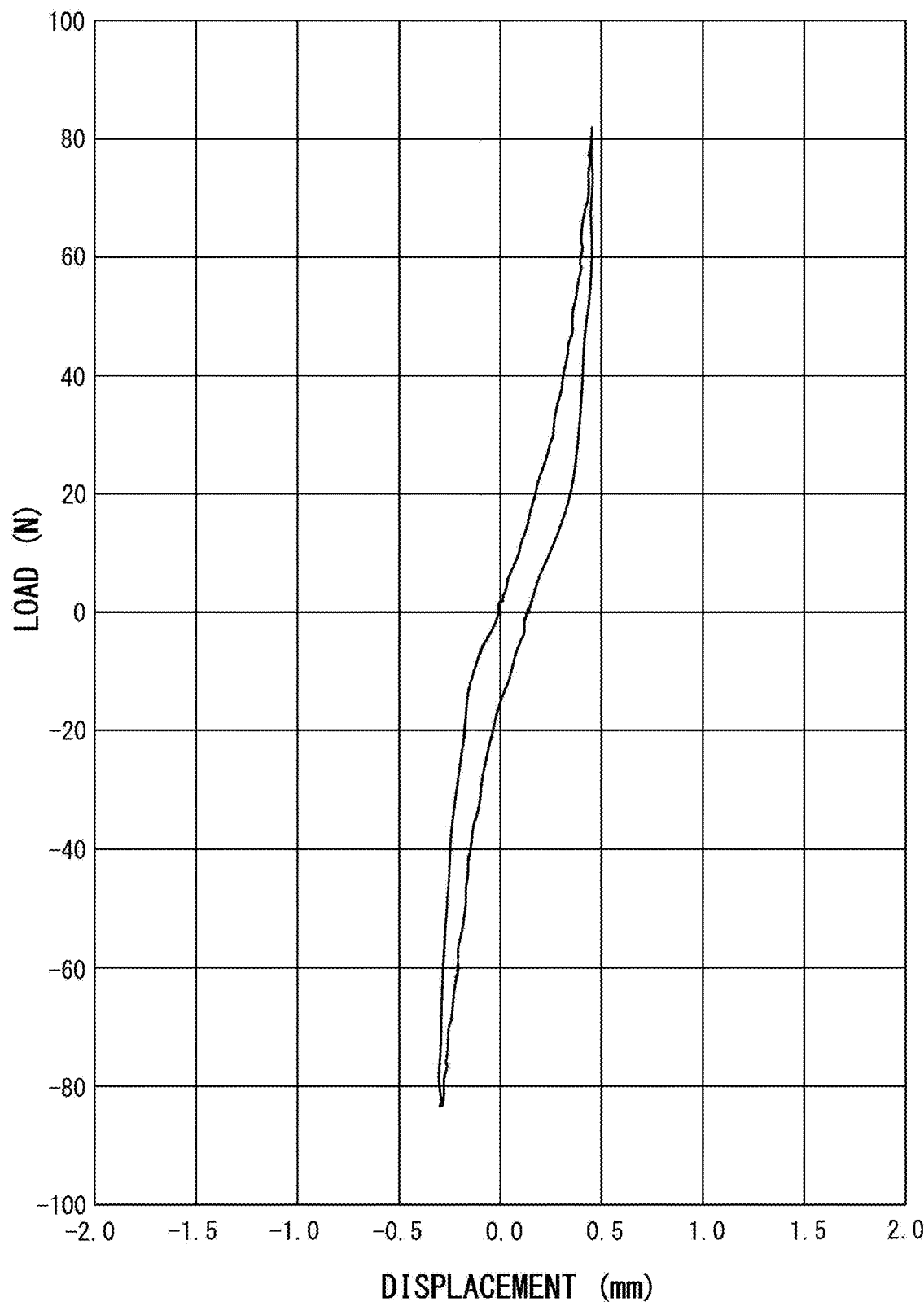
FIG. 16 is a chart illustrating the result of the measurement of the load-displacement characteristic of a test example 3.

FIG. 14 illustrates the measurement result of the test example 1, FIG. 15 illustrates the measurement result of the test example 2, and FIG. 16 illustrates the measurement result of the test example 3. The total displacement amount in the forward and backward directions at the displacement measurement position was 1.46 mm in the test example 1, 1.71 mm in the test example 2, and 0.74 mm in the test example 3. In the test example 1, the angle of inclination of the bracket-side support grooves 23f1, 23h1 is 60 degrees and is the steepest among those in the three test examples, and the circumferential-direction movement of the inner rolling members 90 is the most difficult. However, that the circumferential-direction movement is difficult means that the displacement amount in the direction in which the inner rolling members 90 separate from the bracket-side support grooves 23f1, 23h1 is small, and consequently, the force acting in the thickness direction (the stacking direction of the members) of the seat reclining device 10 is relatively small as compared with the other test examples, so that the lock plates 60A to 60D, the internal gear 30, and the guide bracket 20 displace in the stacking direction relatively easily, though slightly. This may be a reason why the total displacement amount is larger than that in the test example 3 where the angle of inclination of the groove portions 23f3, 23h3 in which the inner rolling members 90 are disposed is 45 degrees.

In the test example 2, the inner rolling members 90 are each supported at two points, but since the angle of inclination of the groove portions 23f3, 23h3 is the smallest, the distance between the "a" point and the "b" point is shorter than those in the test example 1 and the test example 3. This may be a reason why the displacement amount in the circumferential direction is the largest and the total displacement amount is the largest among those in the three test examples.

On the other hand, in the test example 3, since the angle of inclination of the groove portions 23f3, 23h3 is 45 degrees, the force acting in the circumferential direction by the inner rolling members 90 and the accompanying force acting in the direction in which the inner rolling members 90 separate from the groove portions 23f3, 23h3, that is, along the inclined surfaces of the groove portions 23f3, 23h3 are well-balanced, and the relative displacement amounts in the circumferential direction and the separation direction of the inner rolling members 90 are also well-balanced, which may be a reason why the total displacement amount is the smallest.

Further, the result also shows that a hysteresis loss is the largest in the test example 2, the smallest in the test example 1, and the middle therebetween in the test example 3. As the hysteresis loss is larger, damping force is larger, and in the test example 1 and the test example 2, hysteresis curves match each other near the origin, and no damping force is generated near the origin. On the other hand, in the test example 3 in which the angle of inclination of the groove portions 23f3, 23h3 is 45 degrees, there is a certain hysteresis loss in the whole displacement range, and certain damping force is generated. The test example 3 is the most preferable also in view of this.

Note that, in both the cases where the whole bracket-side support grooves 23f1, 23h1 each correspond to the groove portion whose cross section has the substantially V shape as in the test example 1 and where the groove portions 23f3, 23h3 in the bracket-side support grooves 23f1, 23h1 each correspond to the groove portion whose cross section has the substantially V shape as in the test example 2 and the test example 3, the aforesaid 60 degrees, 30 degrees, and 45 degrees given as their angles of inclination are all examples, and the angle of the inclined surfaces is not limited to these angles. In the groove portions with the substantially V-shaped cross section for restricting the circumferential-direction movement of the inner rolling members 90, the rising angle from the groove bottom surface is preferably 25 degrees or more, and from the above test results, is more preferably within a range of 30 to 60 degrees, and the most preferably within a range of 40 to 50 degrees around 45 degrees.

Next, a test of backward moment strength was conducted on automobile seats to which the seat reclining devices 10 of the test examples 1 and 3 were attached respectively and an automobile seat to which a conventional seat reclining device (comparative example 1) was attached. The seat reclining device of the comparative example 1 has neither the outer rolling members 80 nor the inner rolling members 90, and its mounting ring 70 is a ring having an L-shaped cross section and does not have the inward bent portion 711 where to dispose the outer rolling members 80. However, the other structure is the same as that of the test example 1. Further, in the measurement of the backward moment strength, a dummy hip point (H.P.) where a load jig was provided was set at a designed hip point of a seat structure, a load causing a predetermined moment around H.P. was applied from a front side toward a rear side of a seat back part. Incidentally, three samples (test examples 1-(1) to (3), test examples 3-(1) to (3)) were used for the measurement on each of the test example 1 and the test example 3, and five samples (comparative examples 1-(1) to (5)) were used for the measurement on the comparative example 1.

Figure 17:
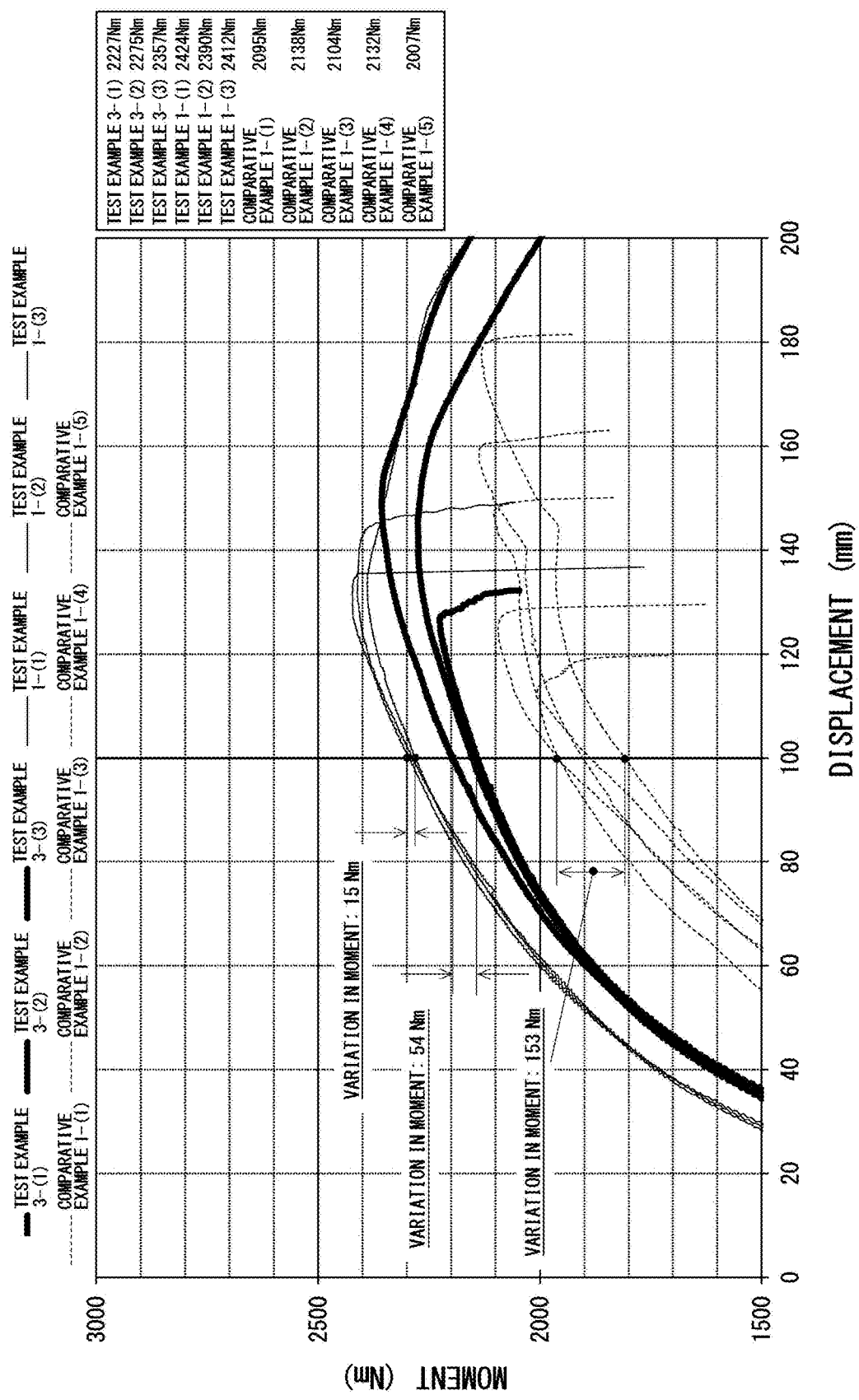
FIG. 17 is a chart illustrating backward moment strengths of the test examples 1 and the test examples 3 together with those of comparative examples 1.

FIG. 17 shows the results. As illustrated in this drawing, the backward moment strength is higher both in the test example 1 and the test example 3 than in the comparative example 1. The comparison between the test example 1 and the test example 3 shows that the backward moment strength is slightly higher in the test example 1. Further, studies on variation of the moment among the samples show that the variation is 153 Nm in the comparative example 1, 54 Nm in the test example 3, and 15 Nm in the test example 1, which has led to the understanding that the use of the outer rolling members 80 and the inner rolling members 90 as in the test examples 1, 3 increases the restriction in the thickness direction and also reduces product errors.

From the above, it follows that, depending on the angle of inclination of the groove portions (the bracket-side support grooves 23/1, 23h1, the groove portions 23/3, 23h3) in which the inner rolling members 90 are disposed, the force acting in the circumferential direction by the inner rolling members 90 and the force acting in the direction in which they try to roll up along the inclined surfaces of the groove portions can be made different, and the backward moment strength can be also made different. As described above, for example, in the case where the angle of inclination is 30 degrees, the displacement along the inclined surfaces is relatively large and absorption of the wobbling in the thickness direction (BL direction of the seat) is excellent, and in the case where the angle of inclination is 60 degrees, the displacement along the inclined surfaces is small and therefore, the wobbling in the circumferential direction (rotation direction) is small and the locking switching operation is quick and thus responsiveness is excellent, and in addition, high backward moment strength is obtained, and in the case where the angle of inclination is 45 degrees, the well-balanced characteristics between these are obtained. The 45 degree angle is preferable in view of the balance as described above, but appropriately selecting the angle of inclination of the groove portions in consideration of such characteristic differences due to the difference in the angle of inclination, it is possible to take a wobbling reducing measure suitable for the structure, frame materials, and so on of the seat, and it is also possible to obtain desired backward moment strength.

Further, contact surfaces with the inner rolling members 90, including the inclined surfaces in the inner surfaces of the bracket-side support grooves 23/1, 23h1, are preferably given higher hardness by heat treatment. Consequently, it is possible to prevent indentation due to the inner rolling to members 90, enabling to maintain the function exhibited by the inner rolling members 90 longer. Regarding this point, as a result of studies on hardness of heat-treated bracket-side support grooves 23/1, 23h1 and non-heat-treated bracket-side support grooves 23/1, 23h1 of the guide bracket 20, the following results were obtained.

Figure 18:
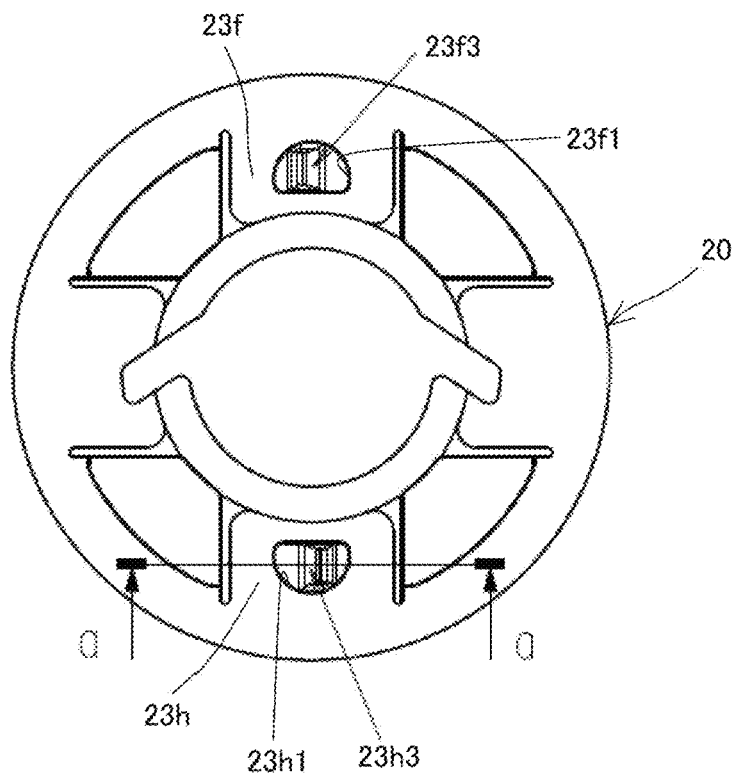
FIG. 18(a) is a plane view of a guide bracket to explain a heat-treated portion and a portion where hardness is measured.
FIG. 18(b) is a sectional view taken along the a-a line in FIG. 18(a).
Figure 18:
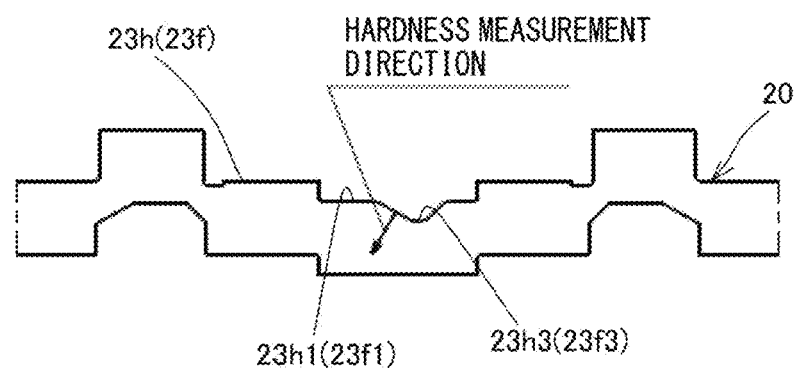
Figure 19A:
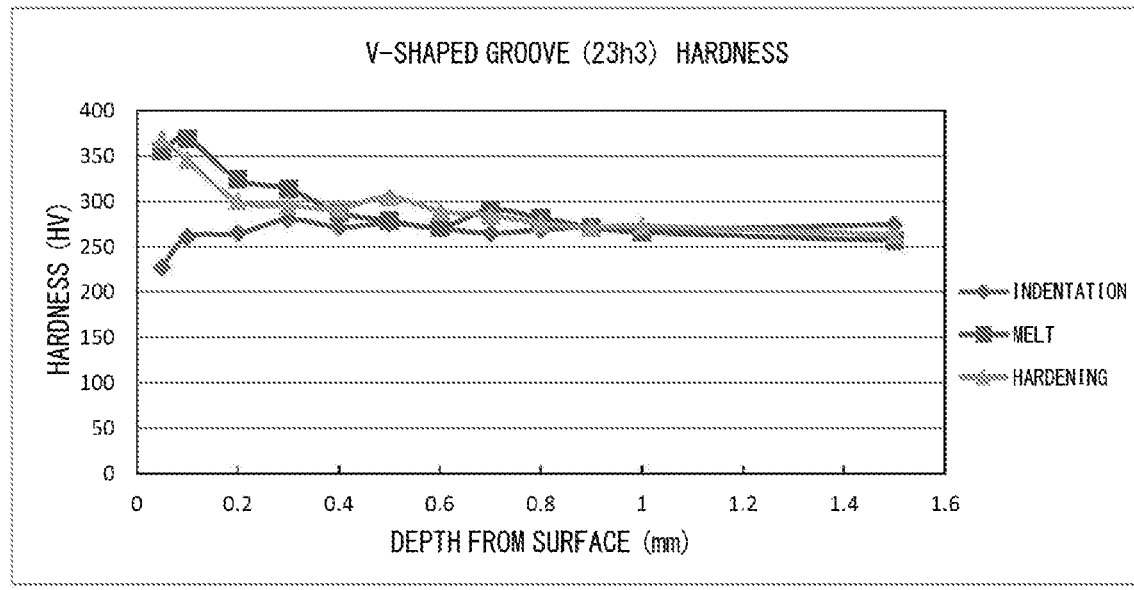
FIGS. 19(a), (b) are charts illustrating the results of the measurement of the hardness.
Figure 19B:
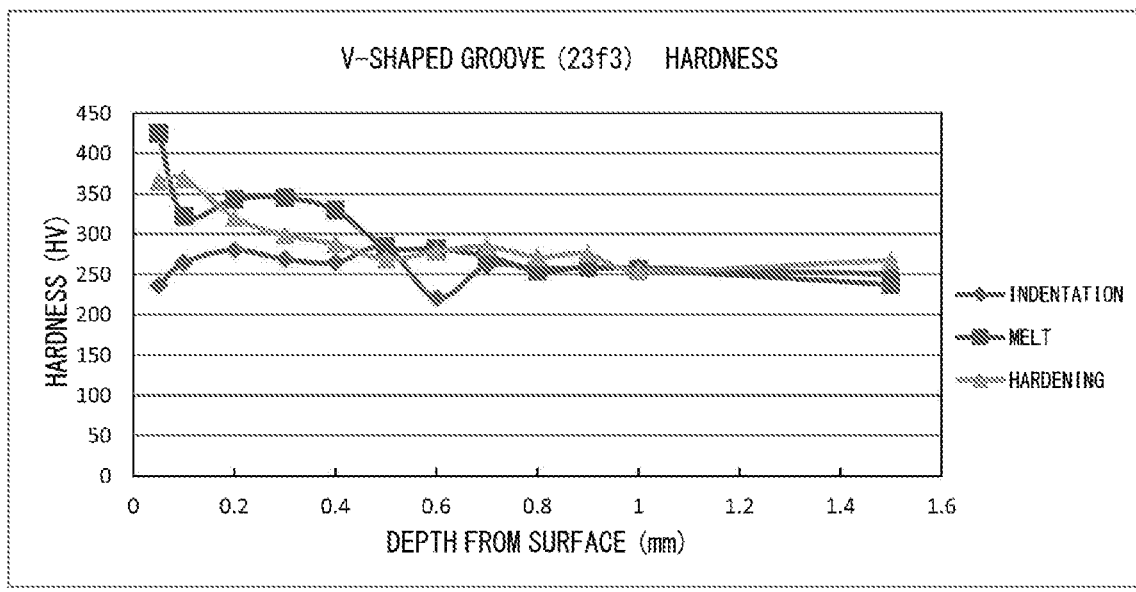

In the heat treatment, the bracket-side support grooves 23/1, 23h1 of the guide bracket 20 were irradiated with laser from their surfaces, and hardness at each depth along the "hardness measurement direction" indicated by the arrow in FIG. 18(b) was measured. FIG. 19 show the results. FIG. 19(a) shows the hardness of the bracket-side support groove 23h1, and FIG. 19(b) shows the hardness of the bracket-side support groove 23/1. Further, in FIGS. 19(a), (b), "melt" represents data of a sample irradiated with the laser until surface melting occurs, and "hardening" represents data of a sample irradiated with the laser to a degree not causing the surface melting. "Indentation" represents data of a sample not having undergone the heat treatment. As is apparent from FIGS. 19(a), (b), the heat-treated sample represented by "hardening" has higher surface hardness at a portion shallower than an about 0.5 mm depth from the surface, as compared with the sample, represented by "indentation", which has not undergone the heat treatment. The sample represented by "melt" in which the surface melting occurs also has high surface hardness in the same manner. Therefore, in order to prevent the indentation due to the rolling of the outer rolling members 80, it is preferable to heat-treat at least the portions in contact with the inner rolling members 90, in the bracket-side support grooves 23/1, 23h1.

EXPLANATION OF REFERENCE SIGNS 10 seat reclining device
20 guide bracket
23a to 23d guide wall portion
23f to 23i guide groove portion
23/1, 23h1 bracket-side support groove
23/3, 23h3 shallow groove portion
30 internal gear
32 internal teeth
40 spiral spring
50 cam
60A to 60D lock plate
60A1, 60C1 plate-side support groove
63 external teeth
70 mounting ring
80 outer rolling member
90 inner rolling member

The invention claimed is:

1. A seat reclining device which includes: a guide bracket attached to one of a seat cushion and a seat back and having a plurality of guide wall portions arranged in a circumferential direction at intervals; an internal gear attached to the other of the seat cushion and the seat back; and a mounting ring having a peripheral surface portion and a ring-shaped bottom surface portion, the peripheral surface portion being fixed to an outer peripheral surface of one of the guide bracket and the internal gear, and the ring-shaped bottom surface portion protruding inward from the peripheral surface portion and being disposed on an outer surface side of the other of the guide bracket and the internal gear, and which supports the seat back so as to allow the seat back to recline with respect to the seat cushion by relative rotation of the guide bracket and the internal gear, the seat reclining device comprising:

a lock mechanism including a lock plate which is disposed in a guide groove portion between adjacent guide wall portions provided on the guide bracket, so as to be operable in a radial direction and which has an outer peripheral surface provided with external teeth engageable with internal teeth of the internal gear;

an outer rolling member disposed between the ring-shaped bottom surface portion of the mounting ring and the outer surface of the guide bracket or the outer surface of the internal gear, that faces the ring-shaped bottom surface portion; and an inner rolling member disposed between opposed surfaces of the guide groove portion of the guide bracket and the lock plate and rollable in the radial direction together with the lock plate, wherein, while the outer rolling member and the inner rolling member press stacked members including the internal gear, the lock plate, and the mounting ring in a stacking direction relatively to one another to reduce wobbling, the outer rolling member causes rolling friction to act between the one of the guide bracket and the internal gear that rotates together with the mounting ring and the other that rotates relatively to the one of the guide bracket and the internal gear, and the inner rolling member causes rolling friction to act between the guide groove portion and the lock plate.

2. The seat reclining device according to claim 1, wherein, in the opposed surfaces, between which the inner rolling member is disposed, of the guide groove portion of the guide bracket and the lock plate at least at one place, support grooves are formed respectively, and the inner rolling member is supported by the support grooves while protruding from the support grooves.

3. The seat reclining device according to claim 2, wherein one of the support grooves formed in the respective opposed surfaces has a groove portion which has a length large enough for the inner rolling member to roll in the radial direction in the groove portion and whose cross section in a direction perpendicular to the radial direction has a V shape.

4. The seat reclining device according to claim 3, wherein the groove portion whose cross section has the V shape has a shape capable of being in contact with the inner rolling member at two points in a view of the cross section, and restricting circumferential-direction movement of the lock plate accompanying the inner rolling member.

5. The seat reclining device according to claim 1, wherein the inner rolling member is disposed between opposed surfaces of a pair of lock plates provided at positions facing each other across a rotation center of the relative rotation of the guide bracket and the internal gear and the corresponding guide groove portions.

6. The seat reclining device according to claim 1, wherein the ring-shaped bottom surface portion of the mounting ring has an inner peripheral circle faced by the guide bracket or the internal gear, the ring-shaped bottom surface portion has an inward bent portion bent inward from a peripheral surface portion side, and the outer rolling member is arranged in plurality on an inner side of the inward bent portion along the circumferential direction.

7. The seat reclining device according to claim 6, wherein the ring-shaped bottom surface portion of the mounting ring partly has a portion where an inner peripheral end surface of the inward bent portion faces an opposed inclined surface of the guide bracket or the internal gear in an oblique direction and is closer to the opposed inclined surface than a rest of the inward bent portion or abuts on the opposed inclined surface.

8. The seat reclining device according to claim 6, wherein the ring-shaped bottom surface portion of the mounting ring partly has a portion where an inner peripheral end surface of the inward bent portion abuts on a surface of an outer surface-side peripheral edge of the guide bracket or the internal gear at a right angle.

9. A seat which includes a seat cushion and a seat back, the seat comprising the seat reclining device according to claim 1 disposed between the seat cushion and the seat back.

* * * * *